US012739765B2

(12) United States Patent
Chisu et al.

(10) Patent No.: US 12,739,765 B2
(45) **Date of Patent: *Sep. 15, 2026**

(54) DEVICE-CONTROLLED ADAPTIVE DELAY DIVERSITY

(71) Applicant: MOTOROLA MOBILITY LLC, Wilmington, DE (US)

(72) Inventors: Daniel C Chisu, Franklin Park, IL (US); Armin W Klomsdorf, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 605 days.

This patent is subject to a terminal disclaimer.

(21) Appl. No.: 18/332,729

(22) Filed: Jun. 10, 2023

(65) Prior Publication Data

US 2024/0163822 A1 May 16, 2024

Related U.S. Application Data

(63) Continuation-in-part of application No. 18/054,577, filed on Nov. 11, 2022, now Pat. No. 12,445,178.

(51) Int. Cl.
*H04W 56/00* (2009.01)
*H04B 7/0456* (2017.01)
*H04L 27/26* (2006.01)

(52) U.S. Cl.
CPC ...... *H04W 56/0035* (2013.01); *H04B 7/0456* (2013.01); *H04L 27/2607* (2013.01); *H04L 27/2657* (2013.01); *H04L 27/2666* (2013.01); *H04W 56/0055* (2013.01)

(58) Field of Classification Search
CPC ............ H04L 27/2607; H04L 27/2657; H04L 27/2666; H04L 27/2636; H04L 27/0008; H04L 27/26025; H04W 56/0035; H04W 56/0055; H04B 7/0456; H04B 7/06; H04B 7/0671; H04B 7/0404
USPC ........................................................ 370/350
See application file for complete search history.

(56) References Cited

U.S. PATENT DOCUMENTS 8,588,335 B2 11/2013 Hamamatsu
2006/0073802 A1 4/2006 Chari
2008/0037680 A1 2/2008 Sakata
2008/0186177 A1 8/2008 Nikitin
(Continued)

*Primary Examiner* — Rownak Islam
(74) *Attorney, Agent, or Firm* — Isidore PLLC

(57) ABSTRACT

A communication device, method, and computer program product optimize cyclic or linear delay diversity for effective transmit diversity that increases transmit power by first and second transmit chains of the communication device while configured for uplink full power transmission mode 1. Using a precoding matrix codebook for multiple-input multiple-output transmission, a controller of the communication device sequentially configures the first transmit chain to transmit an uplink signal and the second transmit chain to transmit the uplink signal with a different phase shift or time delay value. While sequentially transmitting, the controller monitors a measure of uplink signal quality at a network node for each sequentially changed phase shift or time delay values. The controller determines and uses an optimum value for the phase shift or time delay value that results in an optimum uplink signal quality over the evaluated sequence of different phase shift or time delay values.

20 Claims, 13 Drawing Sheets

(56) References Cited

U.S. PATENT DOCUMENTS

| | | | | |
|---|---|---|---|---|
| 2008/0227405 | A1 | 9/2008 | Harel | |
| 2014/0254639 | A1 | 9/2014 | Tahir | |
| 2017/0272137 | A1 | 9/2017 | Qu | |
| 2018/0302144 | A1 | 10/2018 | Kazmi | |
| 2023/0072983 | A1* | 3/2023 | Gao | H04W 72/21 |
| 2023/0345446 | A1 | 10/2023 | Popp | |
| 2025/0175220 | A1* | 5/2025 | Lee | H04W 52/146 |
| 2025/0253905 | A1* | 8/2025 | Matsumura | H04B 7/0456 |

* cited by examiner

| Index | Transmit Antenna Port | Phase Change | Time Delay (μs) | Number TPC up bits |
|---|---|---|---|---|
| 1 | 1 | 0 (original signal) | Not Applicable (Reference) | Not Applicable |
| 2 | 2 | 360° (Starting Angle) | 0.556 | 4 |
| 3 | 2 | ↓ 315° | 0.486 | 3 |
| 4 | 2 | ↓ 270° | 0.417 | 5 |
| 5 | 2 | 360° (Starting Angle) | 0.556 | 4 |
| 6 | 2 | ↑ 405° | 0.625 | 2 |
| 7 | 2 | ↑ 450° | 0.694 | 7 |
| Best time delay index = minimum (CCD Array [index 2..7], number of TPC up bits) = 6. | | | | |
| Best time delay – CDD Array [best time delay index], time delay – 0.625 μs. | | | | |

DEVICE-CONTROLLED ADAPTIVE DELAY DIVERSITY

CROSS REFERENCE TO RELATED APPLICATIONS

The present application is a continuation-in-part of U.S. patent application Ser. No. 18/054,577 entitled "Device-Controlled Adaptive Delay Diversity", filed on Nov. 11, 2022, the disclosure of which is hereby incorporated by reference in its entirety.

1. TECHNICAL FIELD

The present disclosure relates generally to a communication device that supports simultaneous transmissions, and more particularly to a communication device that supports simultaneous transmissions using more than one transmit chain for a high-power mode.

2. DESCRIPTION OF THE RELATED ART

Communication devices are increasingly being designed to support concurrent transmission via more than one transmit chain. For example, in moving from fourth generation long term evolved (LTE) radio access technology (RAT) to fifth generation new radio (5G NR) RAT, communication devices typically have increased a number of transmit chains that operate simultaneously. A typical LTE communication device has a maximum of two transmitters that are simultaneously active, one LTE transmitter and one Wi-Fi transmitter. A 5G NR communication device can have up to two 5G NR transmitters in multiple input multiple output (MIMO) operation, one LTE transmitter, and two Wi-Fi transmitters in MIMO operation. 5G non-standalone (NSA) mode is an option for 5G NR deployment. NSA mode is also referred to as evolved UMTS radio access network and new radio dual connectivity (ENDC) or merely "dual connectivity". Dual connectivity refers to possible concurrent transmission by an LTE transmitter and by a 5G NR transmitter. The multiple transmit chains may also be operated for spatial diversity, selecting antennas that are not blocked by proximity of the antennas to a user's body or vice versa.

A new 29 dBm higher power class (PC) 1.5 is introduced for new radio standalone (NR SA) and for intraband ENDC that require two active transmitters for one of four modes: (i) Mode "A": Transmit Diversity (TxDiv) having one (1) uplink (UL) layer; (ii) Mode "B": UL MIMO uplink full power (ULFP) Transmit Mode 1 having one (1) UL layer; (iii) Mode "C": UL MIMO having two (2) UL layers; and (iv) Mode "D": UL MIMO with one UL layer. Multiple transmit chains are always active in these modes in an attempt to achieve the desired transmit power. However, in some instances, improved communication performance may not be achieved. In an example, signal cancellation may occur depending on antenna and channel correlation when using either of Modes A or B. The signal cancellation may negate any benefit from transmitting more than one transmit channel and may even lead to throughput reduction. For all three of Modes A, B and C, using more than one transmit chain may result in elevated current drain. When stored battery power is low, any communication performance sought by using more than one transmit chain may be less important than being able to communicate for a longer period. Thus, higher power class operation may not always bring significant benefits to uplink communication quality or user experience.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
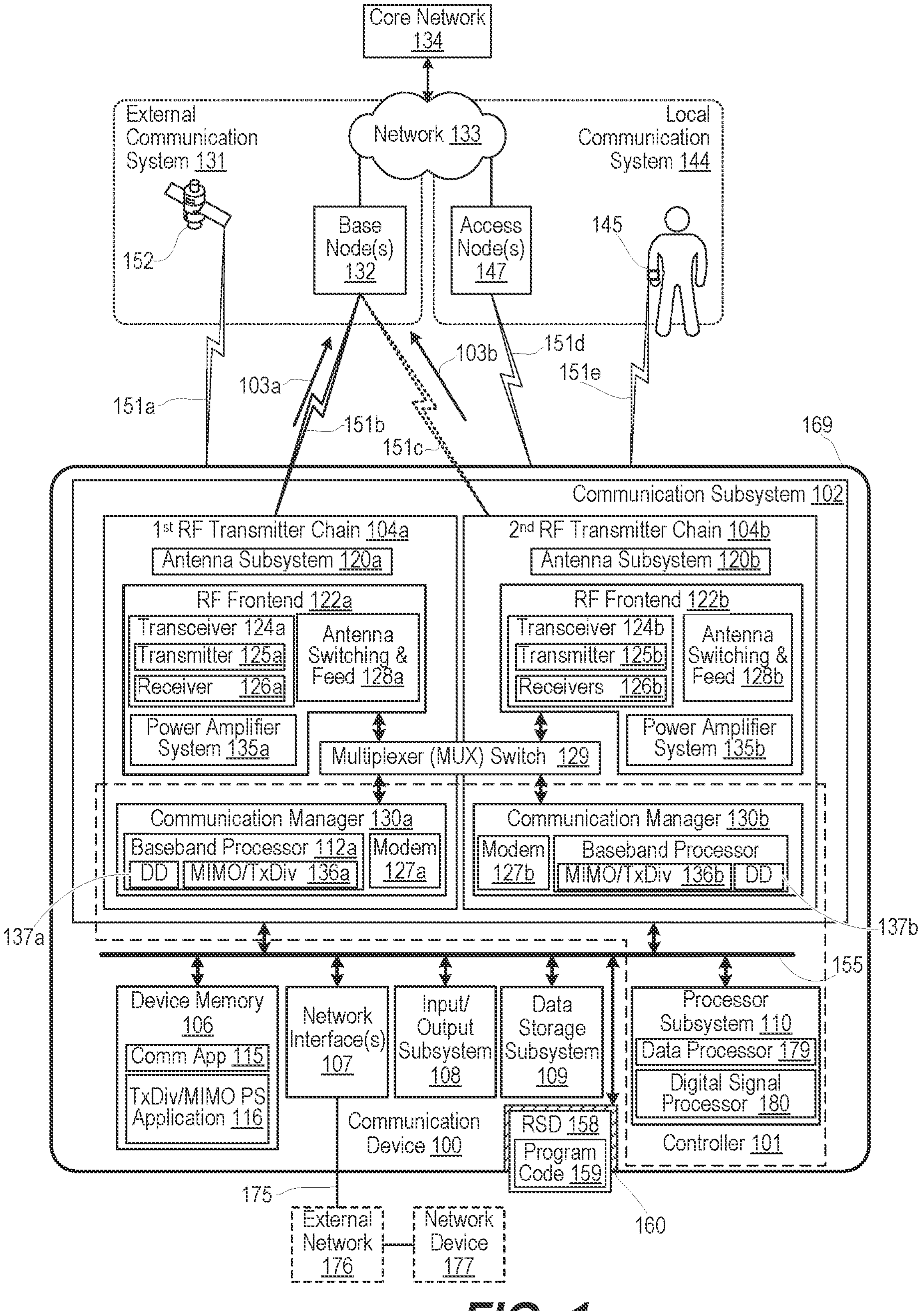
FIG. 1 depicts a functional block diagram of a communication environment including a communication device having a communication subsystem that supports transmit diversity for increased transmit power with optimized delay diversity for effective communication quality, according to one or more embodiments.

According to a first aspect of the present disclosure, a communication device, a method and a computer program product support transmit diversity to achieve increased transmit power from two independent transmit chains of the communication device. By optimizing cyclic delay diversity (CDD) or linear delay diversity (LDD) between the two independent transmit chains, uplink communication performance is improved without having to increase transmit power. Additional current drain caused by increased transmit power is avoided. Aspects of the present disclosure reduce a likelihood of uplink transmissions reaching a network node out of phase and canceling each other. In one or more embodiments, a communications subsystem of the communication device has more than one transmit chains, including at least a first transmit chain and a second transmit chain configurable to perform transmit diversity. A controller of the communication device is communicatively coupled to the communications subsystem. In response to determining a requirement to increase transmit power of an uplink signal to a power level that is more than an individual capacity of either one of the first and the second transmit chains, the controller sequentially configures the first and the second transmit chains to transmit the uplink signal with one of CDD or LDD, which delays the uplink signal transmitted by the second transmit chain with each of more than one phase shift or time delay values. The controller transmits the uplink signal using transmit diversity with sequentially changed phase shift or time delay values for the one of CDD or LDD. The controller monitors at least one of a direct measure and an indirect measure of uplink signal quality at a network node for each of the sequentially changed phase shift or time delay values. The controller determines an optimal phase shift or time delay value for current channel conditions of the more than one phase shift or time delay value associated with a higher measure of uplink signal quality than other ones of the more than one phase shift or time delay values. The controller transmits the uplink signal via transmit diversity using the optimal phase shift or time delay value for the one of CDD or LDD. In one or more embodiments, transmit diversity is optimized with CDD or LDD in an uplink mode that does not require network control of the CDD or LDD and also does not require use of a codebook to implement by the communication device.

According to a second aspect of the present disclosure, transmit diversity is optimized with CDD or LDD while configured for uplink mode of uplink full power transmission (ULFPTx) mode 1, which is a multiple-input multiple-output (MIMO) uplink mode. The communication device includes a communications subsystem having more than one transmit chains that include at least a first transmit chain and a second transmit chain. The first and the second transmit chains are configurable to perform multiple-input multiple-output (MIMO) and transmit diversity uplink transmissions. A controller is communicatively coupled to the communications subsystem. In response to receiving, via the communications subsystem from a base station, an uplink configuration for single data layer uplink full power transmission (ULFPTx) mode 1, the controller accesses a precoding matrix codebook for MIMO configuring of antennas of the first and the second transmit chains. The controller sequentially configures the first and the second transmit chains to transmit an uplink signal with one of: (i) cyclic delay diversity (CDD); or (ii) linear delay diversity (LDD), which delays the uplink signal transmitted by the second transmit chain with each of more than one phase shift or time delay values. The controller transmits the uplink signal using transmit diversity with sequentially changed phase shift or time delay values for the one of CCD or LDD using the precoding matrix codebook. The controller monitors at least one of a direct measure and an indirect measure of uplink signal quality at a network node for each of the sequentially changed phase shift or time delay values. The controller determines an optimal phase shift or time delay value for current channel conditions of the more than one phase shift or time delay values associated with a higher measure of uplink signal quality than other ones of the more than one phase shift or time delay values. The controller transmits the uplink signal via transmit diversity using the optimal phase shift or time delay value for the one of CDD or LDD.

Delay diversity is a technique used to increase the performance of a wireless link by transmitting delayed copies of the same input data signal from multiple transmit antennas. For example, wireless devices, such as wireless routers and other devices commonly used in various types of Wireless Local Area Networks (WLANs) or Wireless Wide Area Networks (WWANs), utilize multiple transmit signals and multiple antennas for transmission of data streams or signals. These multiple transmission channels can be used to transmit copies of the input data stream or data signal. The redundancy of transmitting copies of the data stream increases reliability of the transmit signals. However, to avoid interference between these copies, a delay or time shift is introduced to create a spatial spread between the transmitted copies. Linear Delay Diversity (LDD) delays the uplink signal with a time delay. In particular, LDD delays the second Tx stream (all subcarriers) by a specified time delay. Each subcarrier in the stream is delayed by the same time delay. By contrast, Cyclic Delay Diversity (CDD) delays each incremental subcarrier by an additional time delay as presented in TABLE A:

TABLE A

| Subcarrier | Subcarrier Frequency | Per Subcarrier Cyclic Delay | Cumulative Subcarrier Cyclic Delay | Cumulative Subcarrier Phase Shift |
|---|---|---|---|---|
| 1st | 30 kHz | 0.25 μsec | 0.25 μsec | 2.7 deg |
| 2nd | 30 kHz | 0.25 μsec | 0.5 μsec | 5.4 deg |
| 3rd | 30 kHz | 0.25 μsec | 0.75 μsec | 8.1 deg |
| 4th | 30 kHz | 0.25 μsec | 1.0 μsec | 10.8 deg |

This is observed as a frequency dependent (i.e., subcarrier frequency) phase rotation of the CDD delayed signal versus the undelayed first signal. Each successive subcarrier is rotated by an additional phase shift. If the first subcarrier is shifted by 2.7 deg (versus the same subcarrier in the undelayed or second Tx stream), then the second subcarrier will be delayed by 5.4 deg (versus the same subcarrier in the undelayed or second Tx stream) and on. Additionally, the symbol portion that falls outside the symbol interval is added to the start of the symbol. In one or more embodiments, the time delay is implemented by using coded delay diversity.

Aspects of the present disclosure optimize when a starting cyclic delay value is not dynamically optimized per uplink grants and is not appropriate for real-time field conditions. The optimal delay value prevents use of a suboptimal delay value that could actually lead to degraded performance in some cases. Degraded performance then leads to an increased uplink transmit power that elevates current drain. In addition, achieving an optimal delay value avoids signal cancellation that otherwise may occur depending on antenna and channel correlation. An application executed by a controller of the communication device may require a single layer of an uplink. Another application executed by a controller of the communication device may require another layer of an uplink resulting in more than one layer supported by the transmit chains. Each application may have a different priority, enabling deferring of some communication when too many applications have data to communicate for a communication capacity of the communication device. The transmit chains may be used to support TxDiv for increased total transmit power for an uplink or may be operated in MIMO for multiple path advantages.

Four (4) particular modes of transmission for supporting data layer are discussed below in triggering aspects of the present disclosure. First of the four, designated as Mode “A” herein, is single layer TxDiv with a maximum rank of “1”. TxDiv is radio communication using signals that originate from two or more independent sources that have been modulated with identical information-bearing signals and that may vary in their transmission characteristics at any given instant. TxDiv can help overcome the effects of fading, outages, and circuit failures. When using diversity transmission and reception, the amount of received signal improvement depends on the independence of the fading characteristics of the signal as well as circuit outages and failures. Considering antenna diversity, in many systems, additional antennas may be expensive or impractical to incorporate at a user device or even at the base station. In these cases, TxDiv can be used to provide diversity benefit at a receiver with multiple transmit antennas only. With transmit diversity, multiple antennas transmit delayed versions of a signal, creating frequency-selective fading, which is equalized at the receiver to provide diversity gain. Although Mode A may be used in low, moderate or high pathloss scenarios, Mode A is typically used in higher pathloss scenarios.

Modes B, C and D, as referred to and discussed herein, are for MIMO operation. In radio, MIMO is a method for multiplying the capacity of a radio link using multiple transmission and receiving antennas to exploit multipath propagation. Conventional usage of MIMO specifically refers to a practical technique for sending and receiving more than one data signal simultaneously over the same radio channel by exploiting multipath propagation. Although the multipath phenomenon may be interesting, it is the use of orthogonal frequency-division multiplexing (OFDM) to encode the channels that is responsible for the increase in data capacity. MIMO is fundamentally different from smart antenna techniques developed to enhance the performance of a single data signal, such as beamforming and diversity.

Specifically, Mode B refers to single layer MIMO using uplink full power transmission (ULFPTx) Mode 1, maximum rank of 1. Mode C refers to UL MIMO with two uplink layers with maximum rank “2”. Mode D refers to single layer and maximum rank 2. Although Modes B, C and D may be used in low, moderate or high pathloss scenarios, Mode B is typically used in higher pathloss scenarios. Mode C is typically used in lower pathloss scenarios. Mode D is typically used in moderate pathloss scenarios.

As described herein, aspects of the present disclosure may depend on target power regions in which Modes A, B, C, and D are being used. Region “1” is when target power is greater than an individual transmit power (TxPwr) capability of each chain. For power class (PC) 1.5, target power is greater than 26 dBm. Conversely, Region “2” is when target power is equal to or less than the individual TxPwr capability for each chain. In an example, a category of PC 1.5 may benefit from deactivating one or more transmit chains. Recently defined PC 1.5 doubles the transmit power over a previously defined PC 2 and quadruples power over PC 3 (“normal power”). PC 1.5 can theoretically get 41% better range than PC 2 and double the range of PC 3 for an uplink. Although Modes A, B, C and D may be used in both Regions 1 and 2, typically Modes A and B are used in Region 1 and Modes C and D are used in Region 2.

In a first aspect of the present disclosure, the communication device addresses opportunities for power conservation by mobile devices of higher power class, such as PC 1.5, that require two active transmitters, such as when operating in a single data layer of Modes A, B or D. The specific mention of PC 1.5 is provided as one example. The present disclosure applies to other power classes now specified or defined in the future that require two active transmitters. Although the transmit chains are conventionally always active in these modes, a significant benefit to uplink quality or user experience may not be realized over what may be accomplished with deactivating one or more transmit chains. In one aspect, an entry point for using the present disclosure is thus a PC 1.5 device or a communication device with multiple transmit chains active, in radio resource control (RRC) connected mode with the network, while operating in single layer mode and using low UL resource block (RB)/grant below a power headroom (PHR) threshold. The communication device does not need to transmit PHR for data.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 is a functional block diagram of an electronic device in an operating environment within which the features of the present disclosure are advantageously implemented. In particular, communication device 100 is an example of an electronic device having communication subsystem 102 that supports multiple transmission uplinks 103*a*-103*b* by a plurality of radio frequency (RF) transmit chains 104*a*-104*b* configurable for transmit diversity or MIMO modes in either a single data layer or a two or more data layer mode. In particular, communication subsystem 102 supports transmit diversity for increased transmit power with optimized delay diversity for effective communication quality. For clarity, first and second transmit chains 104*a*-104*b* are depicted; however, communication device 100 can include more than these two RF transmit chains 104*a*-104*b*. In addition, the plurality of RF transmit chains 104*a*-104*b* can include different subsets that support concurrent transmission on different communication frequency bands. Communication device 100 may perform transmit diversity in two or more different communication frequency bands.

Communication device 100 can be one of a host of different types of devices, including but not limited to, a mobile cellular phone, satellite phone, or smart phone, a laptop, a netbook, an ultra-book, a networked smartwatch or networked sports/exercise watch, and/or a tablet computing device or similar device that can include wireless communication functionality. As a device supporting wireless communication, communication device 100 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem.

Referring now to the specific component makeup and the associated functionality of the presented components. In addition to communication subsystem 102, communication device 100 includes controller 101, device memory 106, network interface(s) 107, input/output (I/O) subsystem 108, and data storage subsystem 109 that are each managed by controller 101. Controller 101 may include or consist essentially of processor subsystem 110. In one or more embodiments, controller 101 also includes one or more baseband processors 112*a*-112*b* of respective RF transmit chains 104*a*-104*b*. Device memory 106 stores program code for applications, such as communication application 115, TxDiv/MIMO power saving (PS) application 116, and other application(s). Device memory 106 further includes an operating system (OS), a firmware interface, such as basic input/output system (BIOS) or Uniform Extensible Firmware Interface (UEFI), and firmware.

Controller 101 includes processor subsystem 110, which executes program code to provide operating functionality of communication device 100. The functionality includes configuring communication subsystem 102 for transmit diversity (TxDiv) or MIMO to support increased transmit power or increase antenna efficiency, when necessary, and configuring communication subsystem 102 for fewer transmit chains for power efficiency when satisfactory uplink signal quality is achievable. The software and/or firmware modules have varying functionality when their corresponding program code is executed by processor subsystem 110 or secondary processing devices within communication device 100. Processor subsystem 110 of controller 101 can execute program code of communication application 115, TxDiv/MIMO power saving (PS) application 116 and other application(s) to configure communication device 100 to perform specific functions. Device memory 106 can include data used by the applications. TxDiv/MIMO PS application 116 monitors communication application 115 to determine what transmit uplinks are scheduled. Controller 101, executing TxDiv/MIMO PS application 116, can configure communication subsystem 102 in transmit diversity mode or MIMO for single data layer or multiple data layer, operating at least first and second transmit chains 104*a*-104*b*. Controller 101, executing TxDiv/MIMO PS application 116, can also configure communication subsystem 102 in another mode that uses fewer transmit chains, such as deactivating either of first or second transmit chains 104*a*-104*b*.

Each RF transmit chain 104*a*-104*b* of communication subsystem 110 includes respective antenna subsystems 120*a*-120*b* that support various RF bands for wireless and cellular services. To support newer radio access technologies (RATs) and multi band operation, antenna subsystems 120*a*-120*b* may be configured for dual low band (2L) or quad low band (4L) multiple input multiple output (MIMO) operation that dictates that multiple antennas communicate on multiple bands simultaneously. In one or more embodiments, antenna subsystems 120*a*-120*b* supports lower frequency bands such as ultra-high band (UHB) and higher frequency bands, such as millimeter Wave (mmWave).

Each RF transmit chain 104*a*-104*b* includes respective RF frontends 122*a*-122*b* having one or more transceivers 124*a*-124*b* that includes one or more transmitters 125*a*-125*b* and one or more receivers 126*a* 126*b*. Multiplexer (MUX) switch 129 selectively connects communication managers 130*a*-130*b* to RF frontends 122*a*-122*b*. In one configuration, MUX switch 129 connects communication manager 130*a* to RF frontend 122*a* and connects communication manager 130*b* to RF frontend 122*b*, such as for uplink transmissions. In another configuration, MUX switch 129 connects either communication manager 130*a* to RF frontend 122*a* or connects communication manager 130*b* to RF frontend 122*b* with the other being inactive when not needed for transmit diversity or multiple independent transmissions. In an additional configuration, such as for TxDiv, MUX switch 129 connects one of communication managers 130*a*-130*b* to both RF frontends 122*a*-122*b*, with the other communication manager 130*a*-130*b* being inactive. Each RF transmit chain 104*a*-104*b* includes respective ones of one or more modems 127*a*-127*b*. Each RF transmit chain 104*a*-104*b* respectively includes antenna switching and feed network

128a-128b to connect particular antennas of antenna subsystems 120a-120b at a selected phase delay. Power amplifier systems 135a-135b for respective RF frontends 122a-122b set the transmit power levels provided to antennas connected by antenna switching and feed network 128a-128b.

Each RF transmit chain 104a-104b includes respective communication manager 130a-130b having corresponding baseband processor 112a-112b. Baseband processors 112a-112b communicate with controller 101 and respective RF frontend 122a-122b. In one or more embodiments, baseband processor 112a-112b performs a primary or support function as part of controller 101. Communication subsystem 102 communicates with external communication system 131. Baseband processors 112a-112b operate in baseband frequency range to encode data for transmission and decode received data, according to a communication protocol. Baseband modems 127a-127b modulate baseband encoded data from corresponding communication managers 130a-130b onto a carrier signal to provide a transmit signal that is amplified by power amplifiers in transmitters 125a-125b and delivered to antennas. Baseband modems 127a-127b are respectively configured with MIMO/TxDiv components 136a-136b to encode uplink signals and decode downlink signals that are communicated using MIMO or TxDiv. Baseband modems 127a-127b are respectively configured with delay diversity (DD) components 137a-137b to dynamically delay uplink signals that are communicated using TxDiv. In an example, DD components 137a-137b may support one or more of cyclic delay diversity (CDD), linear delay diversity (LDD), and coded delay diversity.

Baseband processors 112a-112b each include a respective delay diversity component 137a-137b to enhance transmit diversity. In one or more embodiments, cyclic delay diversity is a diversity scheme used in orthogonal frequency division multiplexing (OFDM)-based telecommunication systems to provide frequency diversity, which avoids intersymbol interference. With cyclic delay diversity, a time delay is applied to the OFDM symbol (including the cyclic prefix) at either cyclic delay diversity component 137a or 137b after which the portion of the OFDM symbol which falls outside the symbol boundary is removed and placed at the beginning of the OFDM symbol.

Baseband modems 127a-127b demodulate received signals from external communication system 131 detected by corresponding antenna subsystem 120a-120b. The received signal is amplified and filtered by receivers 126a 126b, which demodulate received encoded data from a received carrier signal. In an example, communication subsystem communicates with cellular network or base nodes 132 that are part of one or more radio access network (RANs) to connect to communication network(s) 133. Communication network(s) 133 may be communicatively connected to core network 134.

In other applications, local communication system 144 can include localized or personal devices 145, such as a wireless headset, head mounted display, and a smart watch. Local communication systems 144 can further include access nodes 147 for wireless communication. Communication devices 100 can be provided communication services by wide area network(s) that are part of external communication system 131 and linked to access nodes 147. Wide area network(s) may also provide data services to communication network(s) 133 that provide communication service to communication device 100 via base nodes 132.

Communication subsystem 102 can concurrently transmit multiple uplink channels and receive multiple downlink channels. In an example, communication subsystem 102 receives satellite broadcast signals 151a from GPS satellites 152. Communication subsystem 102 communicates with base nodes 132 via uplink/downlink channels 151b-151c. Communication subsystem 102 can communicate with access node 147 via transmit/receive signals 151d. Communication subsystem 102 communicates with localized or personal device 145 via transmit/receive signals 151e.

In one or more embodiments, controller 101, via communication subsystem 102, performs multiple types of cellular OTA or wireless communication with external communication system 131. Communication subsystem 110 can communicate via Bluetooth connection with one or more personal access network (PAN) devices, such as localized or personal devices 145. Communication via Bluetooth connection includes both transmission and reception via a Bluetooth transceiver device. In one or more embodiments, communication subsystem 102 communicates with one or more locally networked devices via a wireless local area network (WLAN) link provided by access node 147. In one or more embodiments, access node 147 supports communication using one or more IEEE 802.11 WLAN protocols. Access node 147 is connected to wide area network(s), such as the Internet. In one or more embodiments, communication subsystem 102 communicates with GPS satellites 152 to obtain geospatial location information.

Data storage subsystem 109 of communication device 100 includes data storage device(s). Controller 101 is communicatively connected, via system interlink 155, to data storage device(s). Data storage subsystem 109 provides applications, program code, and stored data on nonvolatile storage that is accessible by controller 101. For example, data storage subsystem 109 can provide a selection of applications and computer data such as TxDiv/MIMO PS application 116. TxDiv/MIMO PS application 116 can be loaded into device memory 106 for execution by controller 101. In one or more embodiments, data storage device(s) can include hard disk drives (HDDs), optical disk drives, and/or solid-state drives (SSDs), etc. Data storage subsystem 109 of communication device 100 can include one or more non-transitory computer readable storage devices or computer readable storage devices, such as removable storage device (RSD) 158 that contains program code 159 and that is received in RSD interface 160. Controller 101 is communicatively connected to RSD 158, via system interlink 155 and RSD interface 160. Controller 101 can access RSD 158 to provision communication device 100 with program code 159, such as code for TxDiv/MIMO PS application 116 and related computer data, that when executed by controller 101 configures computer device 100 to perform functionality described herein.

I/O subsystem 108 includes user interface components such as a display device that presents a user interface. I/O subsystem 108 may include acceleration/movement sensor(s), vibration output device, light output device, image capturing device(s), microphone(s), touch/haptic controls, and audio output device(s). I/O subsystem 108 also may include an I/O controller. The I/O controller provides communication and power signals to functional components described herein as part of communication subsystem 102, device memory 106, I/O subsystem 108, or data storage subsystem 109. The I/O controller connects to internal devices, which are internal to housing 169, and via an electrical cable to tethered peripheral devices, which are external to housing 169 of communication device 100. Internal devices can include computing, storage, communication, or sensing components depicted within housing 169.

The I/O controller supports the necessary configuration of connectors, electrical power, communication protocols, and data buffering to act as an interface between internal devices and peripheral devices tethered by the electrical cable and other components of communication device 100 that use a different configuration for inputs and outputs.

Network interface(s) 107 can include a network interface controller (NIC) with a network connection/cable 175 connection to external network 176. Network connection/cable 175 may include wireless and/or wired links. Network interface(s) 107 support one or more network communication protocols. External network 176 can be a local area network (LAN), a campus area network (CAN), a metropolitan area network (MAN), or a wide area network (WAN). For example, network connection/cable 175 can be an Ethernet connection/cable. Network device 177 is communicatively coupled to wired area network 176.

Controller 101 manages, and in some instances directly controls, the various functions and/or operations of communication device 100. These functions and/or operations include, but are not limited to including, application data processing, communication with second communication devices, navigation tasks, image processing, and signal processing. In one or more alternate embodiments, communication device 100 may use hardware component equivalents for application data processing and signal processing. For example, communication device 100 may use special purpose hardware, dedicated processors, general purpose computers, microprocessor-based computers, micro-controllers, optical computers, analog computers, dedicated processors and/or dedicated hard-wired logic.

Controller 101 includes processor subsystem 110, which includes one or more central processing units (CPUs), depicted as data processor 179. Processor subsystem 110 can include one or more digital signal processors 180 that are integrated with data processor 179. Processor subsystem 110 can include other processors that are communicatively coupled to data processor 179, such as baseband processors **112*a*-112*b* of corresponding communication managers 130*a*-130*b*. In one or embodiments that are not depicted, controller 101 can further include distributed processing and control components that are external to housing 169 or grouped with other components, such as I/O subsystem 108. Data processor 179 is communicatively coupled, via system interlink 155, to device memory 106. In one or more embodiments, data processor 179 is communicatively coupled via system interlink 155 to communication subsystem 102, I/O subsystem 108, and data storage subsystem 109**.

System interlink 155 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (system interlink 155 are illustrated in FIG. 1, it is to be understood that more, fewer, or different interconnections may be present in other embodiments.

According to aspects of the present disclosure, communication subsystem 102 has more than one transmit chains, including at least first transmit chain **104*a* and second transmit chain 104*b*. Controller 101 is communicatively coupled to communication subsystem 102. Controller 101 configures communications subsystem 102 in a first configuration to communicate an uplink with base node 132 in a single layer mode of an uplink data stream using at least first and second transmit chains 104*a*-104*b* to perform one of transmit diversity (TxDiv) mode and multiple input multiple output (MIMO) mode. Controller 101 monitors at least one of a direct or an indirect measure of uplink signal quality of the uplink data stream while connected to base node 132 in the single layer mode via at least first and second transmit chains 104*a*-104*b*. In response to the measure of uplink signal quality indicating satisfactory signal quality, controller 101 deactivates one or more of first and second transmit chains 104*a*-104*b*, leaving at least one transmit chain 104*a*-104*b* active in a second configuration. In one or more embodiments, controller 101 deactivates one or more of transmit chains 104*a*-104*b* by performing one among: (i) turning off at least one transmit chain 104*a*-104*b*; (ii) configuring at least one transmit chain 104*a*-104*b* to operate in a low power mode; and (iii) reducing a transmit power level of at least one transmit chain 104*a*-104*b*. In response to the measure of uplink signal quality indicating unsatisfactory signal quality after deactivating one or more transmit chains 104*a*-104*b*, controller 101 re-activates one or more of the transmit chains 104*a*-104*b*** that were inactivated to return to the first configuration.

In one or more embodiments, controller 101 monitors the direct measure of the uplink signal quality based on transmit power control commands received from base node 132. Controller 101 determines that the direct measure indicates unsatisfactory signal quality based on receiving one or more up commands for transmit power control. In one or more embodiments, controller 101 monitors the indirect measure of the uplink signal quality by tracking one or more among: (i) radio link control (RLC) packet data unit (PDU) retransmit or drop rate; (ii) ratio of acknowledged messages to not acknowledged messages received from the base node; (iii) packet data convergence protocol (PDCP) layer service data unit (SDU)/PDU discard rate; (iv) Internet protocol (IP) layer transport control protocol (TCP) retransmit rate; (v) user datagram protocol (UDP) packet drops; (vi) throughput degradation; and (vi) increase in data latency.

In one or more embodiments, controller 101 re-activates one or more of transmit chains **104*a*-104*b* that were previously inactivated to return to the first configuration in response to identifying one or more among: (i) an inability to decode transmit power control commands in a downlink received from base node 132**; (ii) transitioning from one layer mode to a two layer uplink MIMO mode; (iii) an increase in resource block grant allocation; and (iv) a change to a higher quality of service (QoS).

In one or more embodiments, controller 101 determines whether communication device 100 is: (i) in a first transmit power region that requires a total transmit power for the uplink being greater than a transmit power capability of each of one or more transmit chains **104*a*-104*b*; or (ii) in a second transmit power region that requires the total transmit power for the uplink being equal to or less than the transmit power capability of at least one of transmit chains 104*a*-104*b*. Controller 101 deactivates one or more of transmit chains 104*a*-104*b*, with at least one transmit chain remaining active, in response to either: (i) the measure of uplink signal quality indicating unsatisfactory signal quality; or (ii) determining that communication device 100 is in a second transmit power region. In one or more particular embodiments, controller 101 determines the total transmit power required in response to one of: (i) an active resource block allocation; and (ii) a future slot allocation based on a grant received from base node 132**.

In one or more embodiments, controller 101 configures communications subsystem 102 in a third configuration to communicate the uplink with base node 132 in more than one layer in performing MIMO mode using at least first and second transmit chain 104*a*-104*b*. Controller 101 deactivates one or more of transmit chains 104*a*-104*b*, with at least one transmit chain 104*a*-104*b* remaining active in a fourth configuration, in response to one or more conditions from among: (i) a battery charge level being less than a battery charge level threshold; and (ii) a noncritical application using the uplink. In one or more particular embodiments, subsequent to deactivating the one or more of transmit chains 104*a*-104*b* while communicating in more than one layer in MIMO mode in the fourth configuration, controller 101 re-activates the one or more of transmit chains 104*a*-104*b* that were inactivated in the fourth configuration, to return to the third configuration in response to identifying at least one changed condition from among: (i) communications subsystem 102 being reconfigured to communicate the uplink in the single layer mode and in the MIMO mode; (ii) a quality of service (QoS) for the uplink being increased to a higher level; (iii) the battery charge level being equal to or greater than the battery charge level threshold; and (iv) one or more critical applications requiring re-activation of the one or more of transmit chains 104*a*-104*b*.

Figure 2:
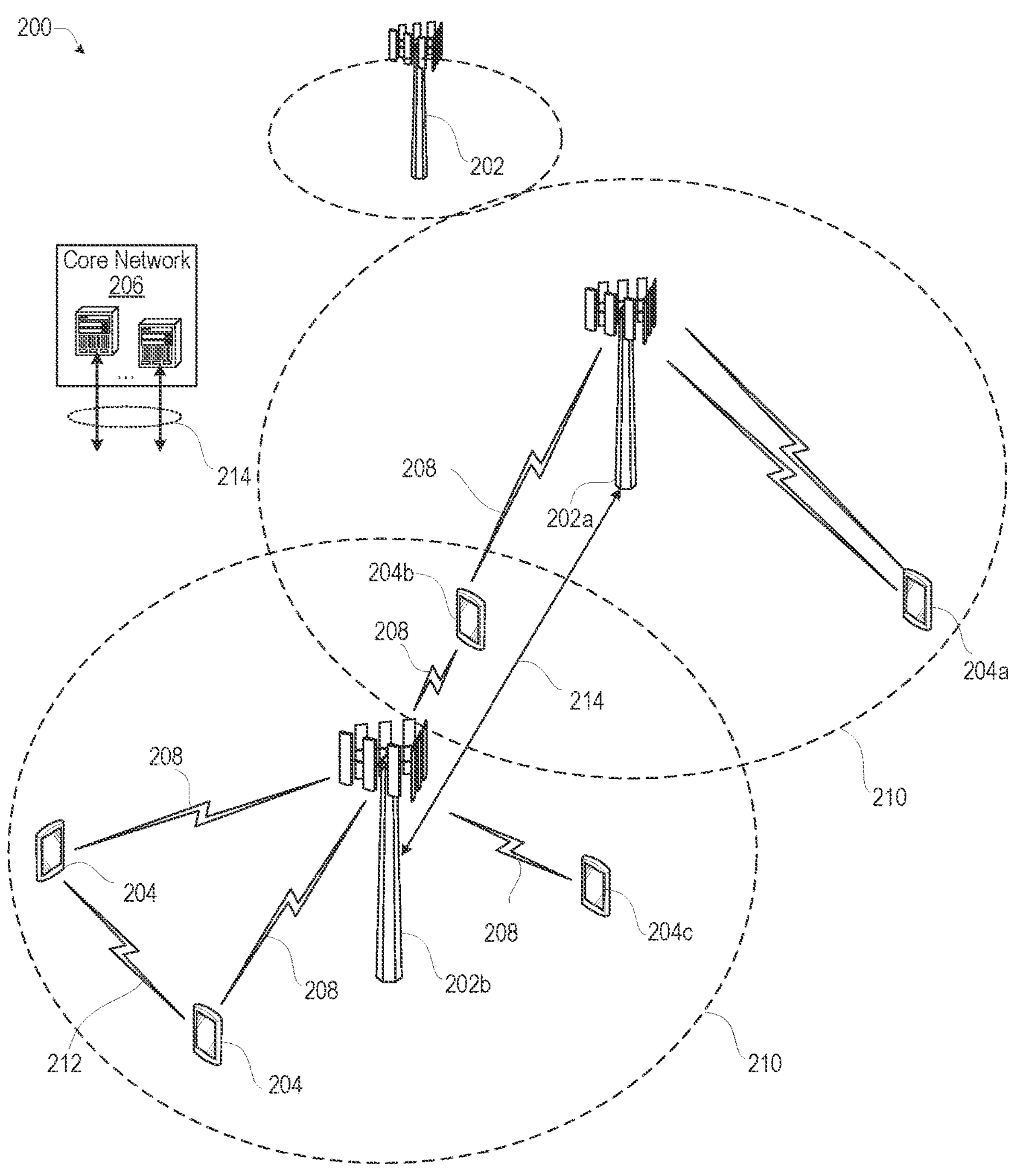
FIG. 2 depicts a wireless communications system that supports transmit diversity with optimized delay diversity, according to one or more embodiments.

FIG. 2 illustrates an example of wireless communications system 200 that supports transmit diversity with optimized delay diversity in accordance with aspects of the present disclosure. Wireless communications system 200 may include one or more base nodes 202, one or more user equipments (UEs) 204*a*, 204*b*, and 204*c* (collectively "204"), and core network 206. Wireless communications system 200 may support various radio access technologies. In some implementations, the wireless communications system 200 may be or may include a 4G network, such as an LTE network or an LTE-Advanced (LTE-A) network. In some other implementations, the wireless communications system 200 may be or may include a 5G network, such as a new radio (NR) network. In other implementations, wireless communications system 200 may be a combination of a 4G network and a 5G network. Wireless communications system 200 may support radio access technologies beyond 5G. Additionally, wireless communications system 200 may support different transmission modes, such as time division multiple access (TDMA), frequency division multiple access (FDMA), or code division multiple access (CDMA), etc.

One or more base nodes 202 may be dispersed throughout a geographic region to form the backbone infrastructure of wireless communications system 200. One or more of base nodes 202*a*-202*b* (collectively "202") described herein may be, may include, or may be referred to as a base transceiver station, an access point, a NodeB, an evolution NodeB (eNB), a next-generation NodeB (gNB), or other suitable terminology. Base nodes 202 and UEs 204 may communicate via communication links 208, which may be a wireless or wired connection. In an example, base node 202 and UE 204 may wirelessly communication over a user unit (Uu) interface.

Base node 202 may provide geographic coverage area 210 for which base node 202 may support services (e.g., voice, video, packet data, messaging, broadcast, etc.) for one or more UEs 204 within geographic coverage area 210. For example, base node 202 and UE 204 may support wireless communication of signals related to services (e.g., voice, video, packet data, messaging, broadcast, etc.) according to one or multiple radio access technologies. In some implementations, base node 202 may be moveable. For example, base node 202 may be a satellite associated with a non-terrestrial network. In some implementations, different geographic coverage areas 210 associated with the same or different radio access technologies may overlap, but the different geographic coverage areas 210 may be associated with different base nodes 202. Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

One or more UEs 204 may be dispersed throughout a geographic region of wireless communications system 200. UE 204 may include or may be referred to as a mobile device, a wireless device, a remote device, a handheld device, or a subscriber device, or some other suitable terminology. In some implementations, UE 204 may be referred to as a unit, a station, a terminal, or a client, among other examples. Additionally, or alternatively, the UE 204 may be referred to as an Internet-of-Things (IoT) device, an Internet-of-Everything (IoE) device, or machine-type communication (MTC) device, among other examples. In some implementations, UE 204 may be stationary in wireless communications system 200. In some other implementations, UE 204 may be mobile in wireless communications system 200.

One or more UEs 204 may be devices in different forms or having different capabilities. UE 204 may be capable of communicating with various types of devices, such as base nodes 202, other UEs 204, or network equipment (e.g., core network 206, a relay device, an integrated access and backhaul (IAB) node, or another network equipment), as shown in FIG. 2. Additionally, or alternatively, UE 204 may support communication with other base nodes 202 or UEs 204, which may act as relays in the wireless communications system 200.

UE 204 may also be able to support wireless communication directly with other UEs 204 over communication link 212. For example, UE 204 may support wireless communication directly with another UE 204 over a device-to-device (D2D) communication link. In some implementations, such as vehicle-to-vehicle (V2V) deployments, vehicle-to-everything (V2X) deployments, or cellular-V2X deployments, the communication link 212 may be referred to as a sidelink. For example, a UE 204 may support wireless communication directly with another UE 204 over a PC5 interface. UEs 204 can use transmit diversity according to aspects of the present disclosure to increase transmit power levels in a power efficient manner.

Base node 202 may support communications with core network 206, or with another base node 202, or both. For example, base node 202 may interface with core network 206 through one or more backhaul links 214 (e.g., via an S1, N2, N2, or another network interface). The base nodes 202 may communicate with each other over backhaul links 214 (e.g., via X2, Xn, or another network interface). Core network 206 may support user authentication, access authorization, tracking, connectivity, and other access, routing, or mobility functions. Core network 206 may be an evolved packet core (EPC), or a 5G core (5GC)

Figure 3:
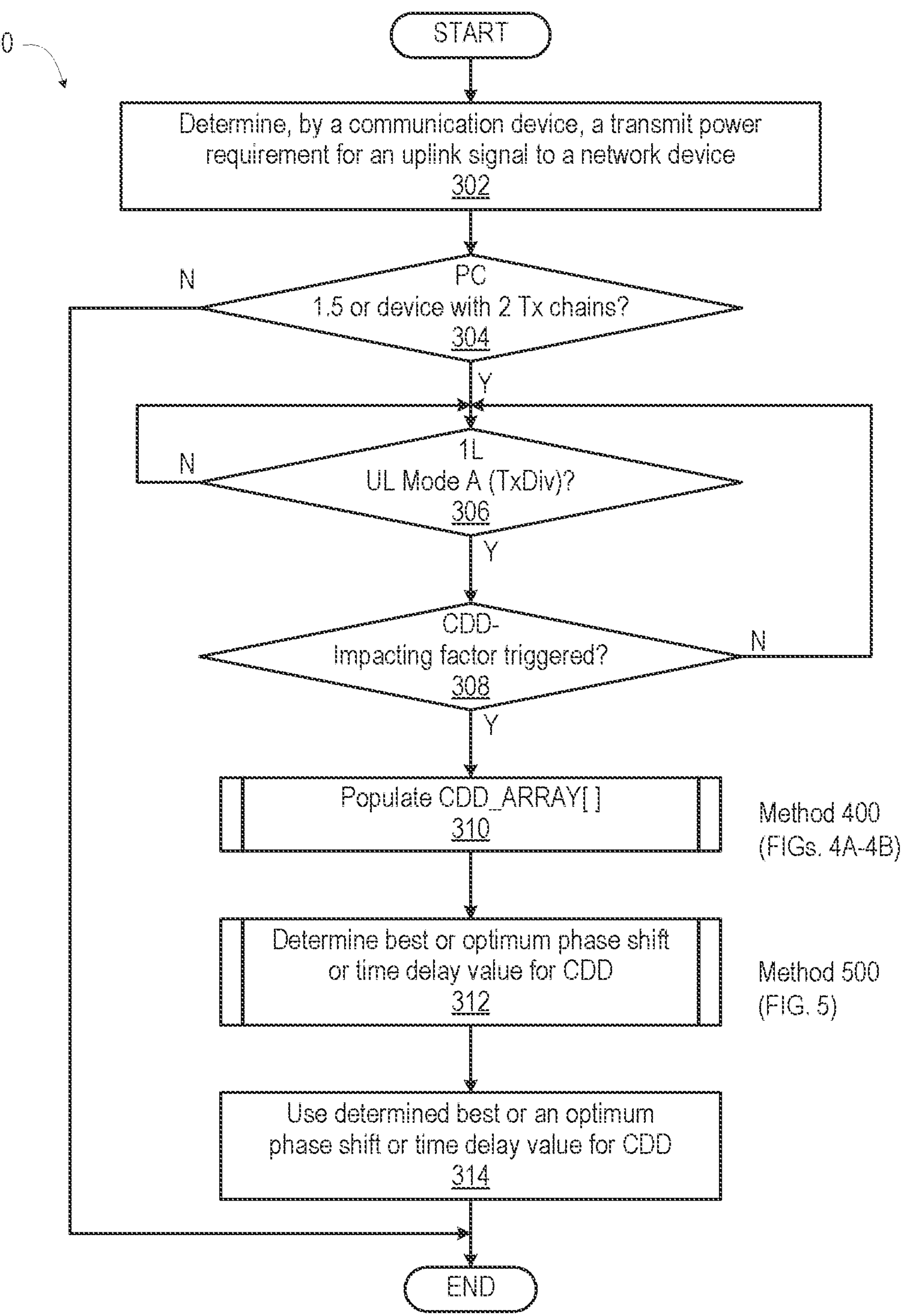
FIG. 3 is a flow diagram presenting a high-level method performed by a communication device for optimizing delay diversity that enables effective communication using transmit diversity for increased transmit power, according to one or more embodiments.
Figure 4A:
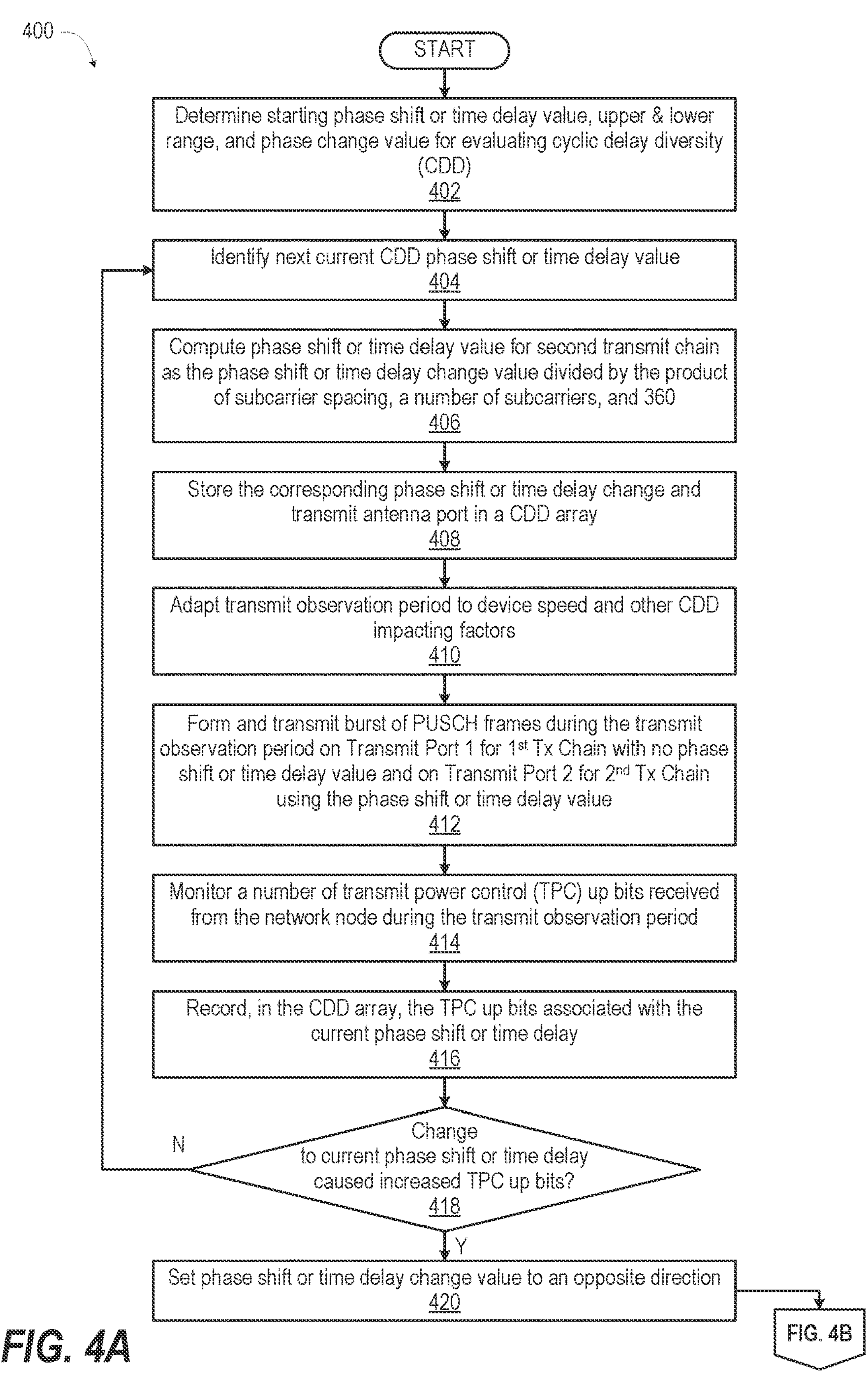
FIGS. 4A-4B (collectively "FIG. 4") are a flow diagram presenting a method for populating a cyclic delay diversity (CDD) array used during evaluation of possible phase shift or time delay values for CDD according to the method of FIG. 3, according to one or more embodiments.
Figure 4B:
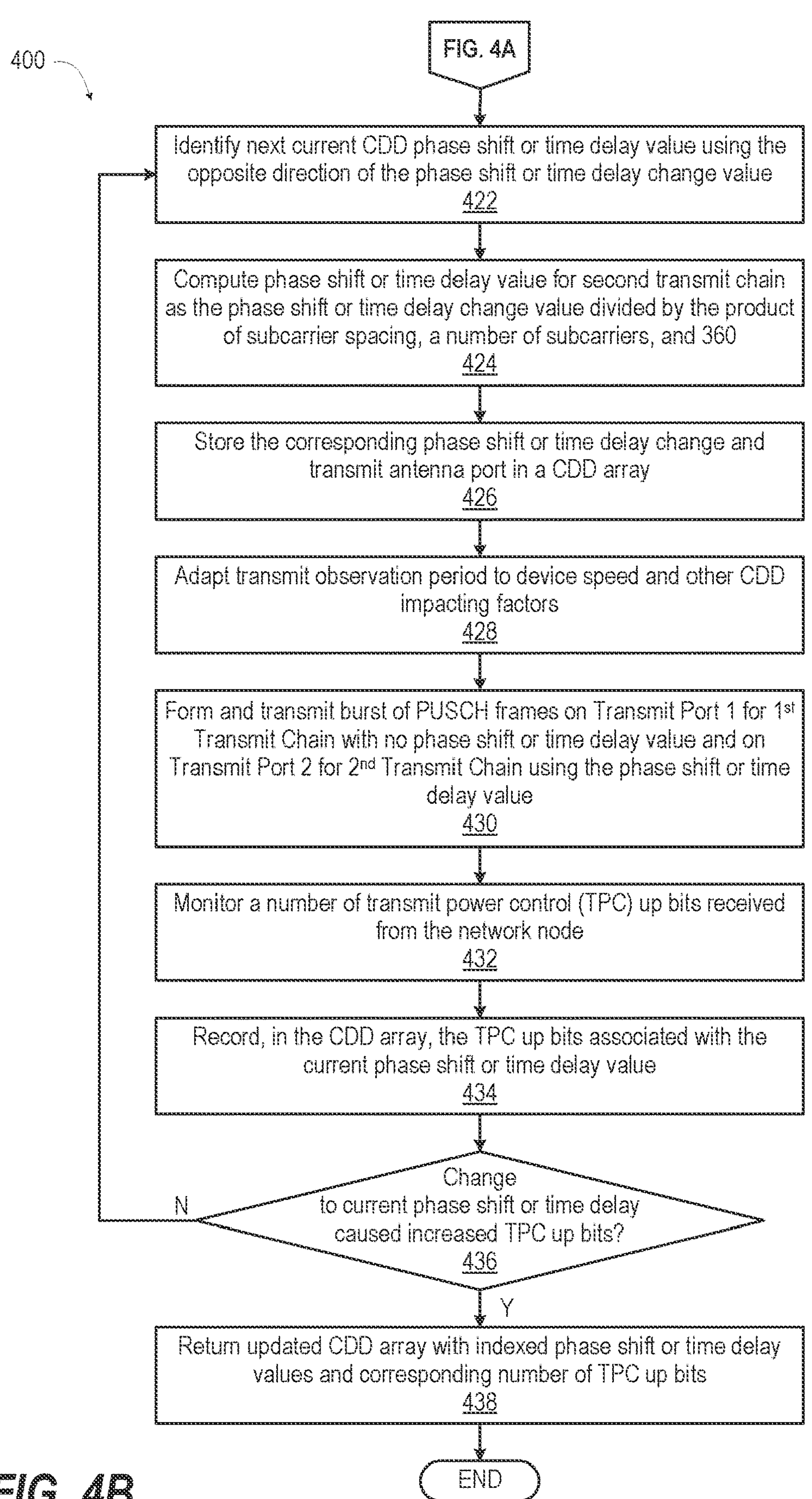
Figure 5:
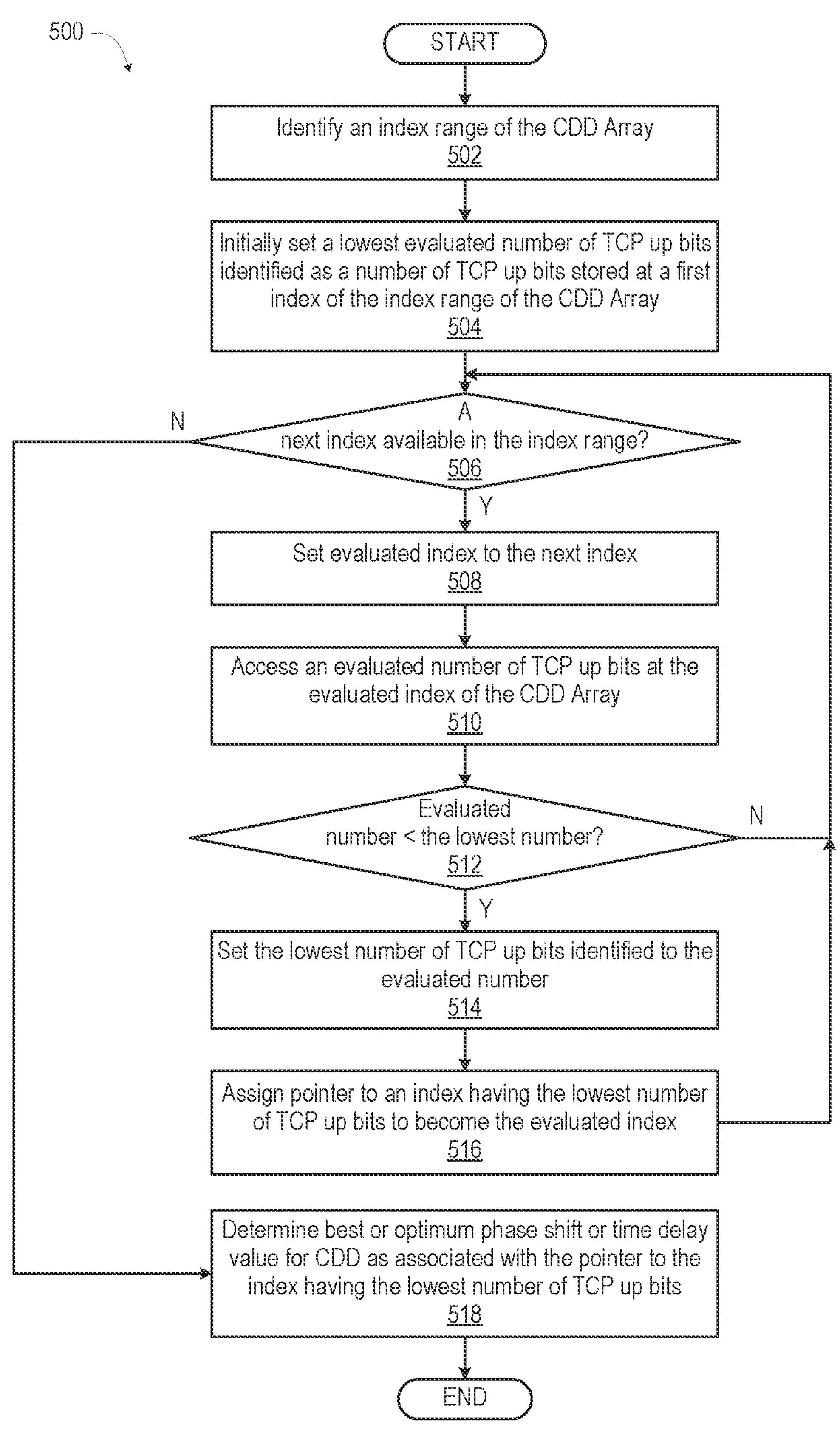
FIG. 5 is a flow diagram presenting a method for identifying a best or optimum phase shift or time delay using the CCD array during evaluation of possible phase shift or time delay values for CDD according to the method of FIG. 3, according to one or more embodiments.

FIG. 3 is a high-level flow diagram presenting method 300 performed by a communication device for optimizing delay diversity that enables effective communication using transmit diversity for increased transmit power. FIGS. 4A-4B (collectively "FIG. 4") are a flow diagram presenting method 400 for populating a cyclic delay diversity (CDD) array used during evaluation of possible phase shift or time delay values for CDD, according to method 300 of FIG. 3. FIG. 5 is a flow diagram presenting method 500 for identifying a best or optimum phase shift or time delay using the CCD array during evaluation of possible phase shift or time delay values for CDD, according to the method of FIG. 3. The descriptions of method 300 (FIG. 3), method 400 (FIGS. 4A-4B), and method 500 (FIG. 5) are provided with general reference to the specific components illustrated within the preceding FIGS. 1-2. Specific components referenced in method 300 (FIG. 3), method 400 (FIGS. 4A-4B), and method 500 (FIG. 5) may be identical or similar to components of the same name used in describing preceding FIGS. 1-2. In one or more embodiments, controller 101 configures communication device 100 (FIG. 1) or UE 204*a* (FIG. 2) to provide the described functionality of method 300 (FIG. 3), method 400 (FIGS. 4A-4B), and method 500 (FIG. 5).

With reference to FIG. 3, method 300 includes determining, by a communication device, a transmit power requirement for an uplink signal to a network device (block 302). Method 300 includes determining whether a communication device is a power class (PC) 1.5 device or other type of communication device having multiple transmit chains active in a radio resource control (RRC) connected state (decision block 304). In response to determining that the communication device is not PC 1.5 and not the type having multiple transmit chain active, method 300 ends. In response to determining that the communication device is either PC 1.5 or the type having multiple transmit chain active, method 300 includes determining whether the communication device is operating in single layer (1L) uplink (UL) Mode A for TxDiv (decision block 306). In an example, the communication device is using a low uplink resource block/grant that is below a power headroom threshold (PHR) such that the communication device does not need transmit PHR for data. In response to determining that the communication device is not operating in 1L UL Mode A, method 300 returns to block 306. In response to determining that the communication device is operating in 1L UL Mode A, method 300 includes determining whether a CDD-impacting factor is triggered (decision block 308). In an example, the one or more changing factors are among a group comprising: (i) device mobility speed; (ii) fading profile; (iii) operating frequency band; (iv) device operating region; (v) sensor-detected obstruction to uplink signal; (vi) radio access technology (RAT); (v) continuous transmit power control up bits; (vi) inability to decode transmit power control bits in a downlink from the network node; (vii) network allocation of one or more of size of resource block allocation and scheduling rate; and (viii) antenna correlation. In response to determining that a CDD-impacting factor is not triggered, method 300 returns to block 306. In response to determining that a CDD-impacting factor is triggered, method 300 includes populating a CDD array (block 310). An example CDD array is presented in FIG. 6, which is described later. An example implementation of block 310 is described below as method 400 (FIGS. 4A-4B). With continued reference to FIG. 3, method 300 includes determining a best or an optimum phase shift or time delay value (block 312). An example implementation of block 312 is described below as method 500 (FIG. 5). With continued reference to FIG. 3, method 300 includes using the determined best or optimum phase shift or time delay value for CDD (block 314). Then method 300 ends.

With reference to FIG. 4A, method 400 includes determining starting phase shift or time delay value, upper & lower range, and phase change value for evaluating cyclic delay diversity (CDD) (block 402). Method 400 includes identifying next current CDD phase shift or time delay value (block 404). Method 400 includes computing phase shift or time delay value for second transmit chain as the phase shift or time delay change value divided by the product of subcarrier spacing, a number of subcarriers, and 360 (block 406). Method 400 includes storing the corresponding phase shift or time delay change and transmit antenna port in a CDD array (block 408). An antenna port is defined such that the channel over which a symbol on the antenna port is conveyed can be inferred from the channel over which another symbol on the same antenna port is conveyed. Although multiantenna features are treated extensively in 3GPP specifications, the antennas are rarely described as hardware components. Features and procedures are instead referred to as antenna ports. In the 3GPP specifications, an antenna port is an abstract concept that is a logical entity rather than a physical antenna. Method 400 includes adapting transmit observation period to device speed and other CDD impacting factors (block 410). Method 400 includes forming and transmitting a burst of PUSCH frames during the transmit observation period on Transmit Port 1 for 1st Transmit Chain with no phase shift or time delay value and on Transmit Port 2 for 2nd Transmit Chain using the phase shift or time delay value (block 412). Method 400 includes monitoring a number of transmit power control (TPC) up bits received from the network node during the transmit observation period (block 414). Method 400 includes recording, in the CDD array, the TPC up bits associated with the current phase shift or time delay (block 416). Method 400 includes determining whether the change to current phase shift or time delay caused increased TPC up bits (decision block 418). In response to determining that the change to current phase shift or time delay did not cause increased TPC up bits (i.e., TCP up bits were the same or were reduced), method 400 returns to block 404. In response to determining that the change to current phase shift or time delay caused increased TPC up bits, method 400 includes setting phase shift or time delay change value to an opposite direction (block 420). Then method 400 proceeds to block 422 (FIG. 4B).

With reference to FIG. 4B, method 400 includes identifying the next current CDD phase shift or time delay value using the opposite direction of the phase shift or time delay change value (block 422). Method 400 includes computing phase shift or time delay value for second transmit chain as the phase shift or time delay change value divided by the product of subcarrier spacing, a number of subcarriers, and 360 (block 424). Method 400 includes storing the corresponding phase shift or time delay change and transmit antenna port in the CDD array (block 426). Method 400 includes adapting a transmit observation period to device speed and other CDD impacting factors (block 428). Method 400 includes forming and transmitting burst of PUSCH frames during the transmit observation period on Transmit Port 1 for 1st Transmit Chain with no phase shift or time delay value and on Transmit Port 2 for 2nd Transmit Chain using the phase shift or time delay value (block 430). Method 400 includes monitoring a number of transmit power control (TPC) up bits received from the network node during the transmit observation period (block 432). Method 400 includes recording, in the CDD array, the TPC up bits associated with the current phase shift or time delay value (block 434). Method 400 includes determining whether a change to current phase shift or time delay caused increased TPC up bits (decision block 436). The change to the phase shift is less than or equal to a cyclic prefix (CP) length. In response to determining that the change to the current phase shift or time delay did not cause an increase in TPC up bits (i.e., the TPC up bits are the same or less), method 400 returns to block 422. In response to determining that the change to the current phase shift or time delay caused an increase in TPC up bits, method 400 includes returning an updated CDD array with indexed phase shift or time delay values and corresponding number of TPC up bits (block 438). Then method 400 ends.

With reference to FIG. 5, method 500 includes identifying an index range of the CDD Array (block 502). Method 500 includes initially setting a lowest evaluated number of TCP up bits identified as a number of TCP up bits stored at a first index of the index range of the CDD Array (block 504). Method 500 includes determining whether a next index is available in the index range (decision block 506). In response to determining that there is a next index available in the index range, method 500 includes setting evaluated index to the next index (block 508). Method 500 includes accessing an evaluated number of TCP up bits at the evaluated index of the CDD Array (block 510). Method 500 includes determining whether the evaluated number is greater than the lowest number (decision block 512). In response to determining that the evaluated number is not less than (i.e., equal to or greater than) the lowest number, method 500 returns to block 506. In response to determining that the evaluated number is less than the lowest number, method 500 includes setting the lowest number of TCP up bits identified to the evaluated number (block 514). Method 500 includes assigning the pointer to an index having the lowest number of TCP up bits to the evaluated index (block 516). Then method 500 returns to block 506. In response to determining that there is not a next index available in the index range in decision block 506, method 500 includes determining a best or an optimum phase shift or time delay value for CDD as associated with the pointer to the index having the lowest number of TCP up bits (block 518). Then method 500 ends.

In one or more aspects of the present disclosure, method 300 (FIG. 3) and method 400 (FIGS. 4A-4B) support transmit diversity in wireless communication with improved uplink performance and reduced current drain. The chances are reduced for uplink transmissions reaching a network or base node out of phase sufficiently to result in cancellation of the uplink transmissions. Method 300 (FIG. 3) and method 400 (FIGS. 4A-4B) may apply in single layer uplink modes, such as TxDiv, where resource block (RB) allocation is generally low, and the UL RB/grant are below a PHR threshold. Method 300 (FIG. 3) and method 400 (FIGS. 4A-4B) automatically determines the best delay diversity phase shift or time delay value, such as a CDD time delay value, to use in any given environment. In particular, the time delay value at different phase rotation shifts over a whole sphere are characterized, and then the number of resulting TPC up bits from the network device are checked. The phase shift associated with the fewest number of TPC-UP bits is the most optimum. The communication device then forms and transmits signals using the CCD delay value corresponding to this optimum delay value.

In one or more embodiments, the lower and upper bounds of the phase shift are governed by at least the resulting #TPC-UP bits and the cyclic_prefix (CP) length. In one or more embodiments, the phase shift rotation is applied in both directions, based on TPC feedback. For example, when cycling through the sequential phase shift or time delay value, an increase in TPC-UP bits causes the direction of cycling through the sequential phase shift or time delay values to be reversed, and the process of cycling forwards and backwards stops when there is no further benefit (i.e., the number of TPC-UP bits remains relatively the same). In one or more embodiments, the evaluation for an optimum phase shift or time delay value is repeated if changes in CDD-impacting-factors are detected, according to a “CDD-impacting-factors” table. If the communication device receives continuous TPC-UP bits or if the setting of the optimum phase shift or time delay value fails, the communication device reverts to using the previous best phase shift or time delay value, while calculating a new one. In one or more embodiments, the “observation” period, or Tx burst duration, is adaptive based on CDD-impacting factors such as speed of the communication device. For example, fast speeds will result in shorter Tx observation periods. By optimizing delay diversity, the communication device may experience one or more benefits, such as optimizing uplink performance and battery utilization in 1 UL layer modes such as TxDiv.

Figure 6:
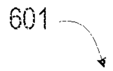
FIG. 6 is a sample CDD array utilized by the method of FIGS. 3, 4A-4B, and 5, according to aspects of the present disclosure.

FIG. 6 is sample CDD array 601 utilized by method 300 (FIG. 3), method 400 (FIGS. 4A-4B), and method 500 (FIG. 5). CDD array 601 is generated for a scenario using two transmit ports, Ports 1 and 2, ten (10) resource blocks (RBs) with 120 subcarriers, 15 kHz subcarrier spacing, and uplink cyclic prefix normal, length 1 (“ul_cyclic_prefix normal/len1”). In this example, the phase rotation is set as, but is not limited to, 45°. The communication device applies phase rotation in both directions using TPC feedback. Sample CDD array 601 captures the evaluations with a current delay diversity setting in line 1 that is sequentially changed in lines 2 through 7, identified by corresponding indices. When cycling through phase shift or time delay values, the algorithm tries both increasing and decreasing phase to find the optimum phase shift or time delay value. At index 2, the starting phase shift or time delay value is the starting value of 0 or 360°, which corresponds to an implemented current delay of 0.556 μs. The uplink at this phase shift or time delay value results in 4 TPC up bits. At index 3, the phase change of −45° is set, resulting in a phase of 315° (0.486 μs). The uplink at this phase shift or time delay value results in 3 TPC up bits, which is an improving trend, so the algorithm continues in the same direction. At index 4, the phase change of −45° is set, resulting in a phase of 270° (0.417 μs). The uplink at this phase shift or time delay value results in 5 TPC up bits, which is a degrading trend, so the algorithm then reverses direction. At index 5, the algorithm returns to the same settings and results as index 2. At index 6, the phase change of +45° is set, resulting in a phase of 405° (0.625 μs). The uplink at this phase shift or time delay value results in 2 TPC up bits, which is an improving trend, so the algorithm continues in the same direction. At index 7, the phase change of +45° is set, resulting in a phase of 450° (0.694 μs). The uplink at this phase shift or time delay value results in 7 TPC up bits, which is a degrading trend so the algorithm then concludes having identified a range around the current phase shift or time delay value from which an optimum phase shift or time delay value may be identified. In particular, best time delay index=minimum (CDD Array [index 2 . . . 7], number of TPC up bits)=index 6. Best time delay=CDD Array [best time delay index], time delay=0.625 μs.

Figure 7A:
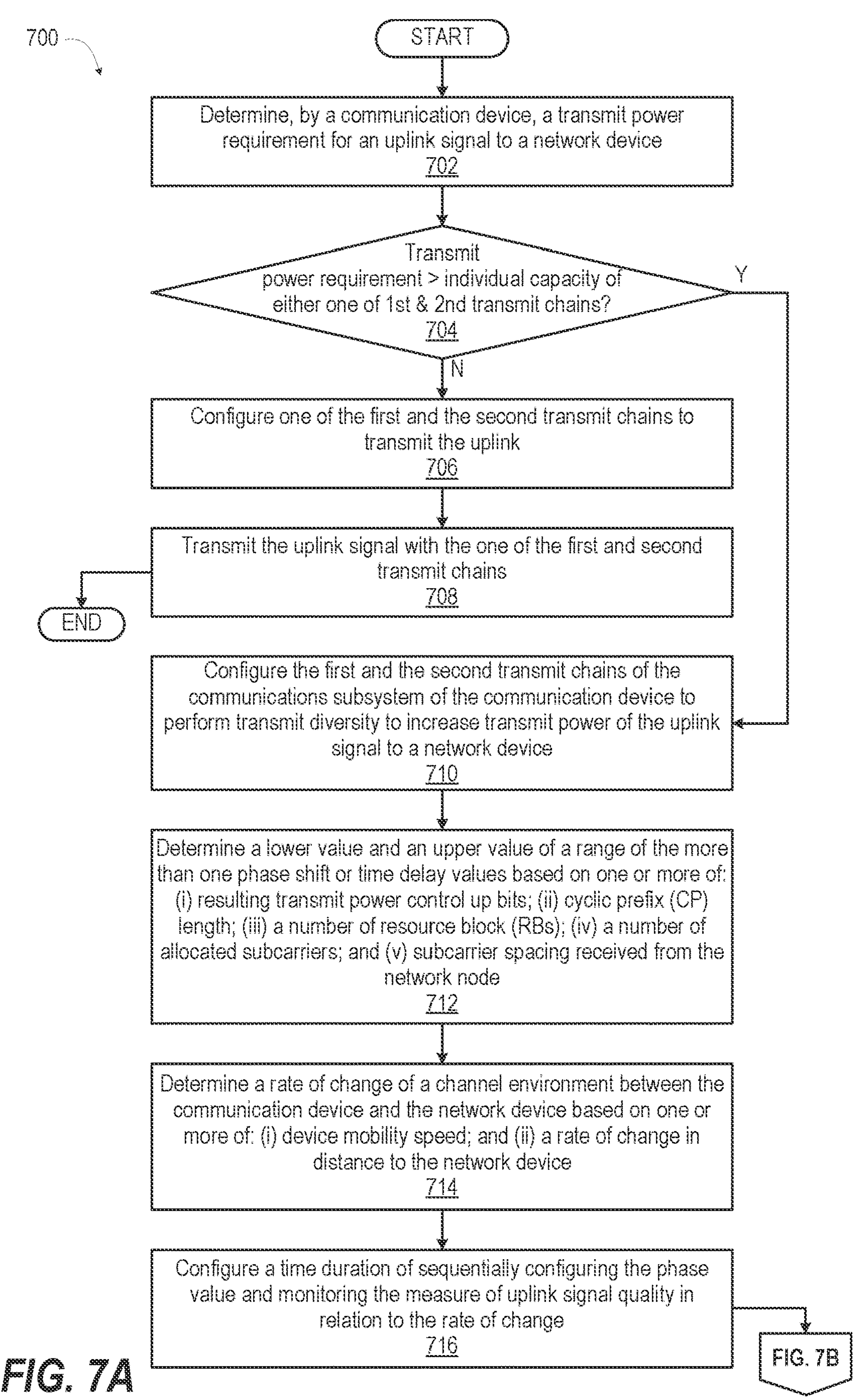
FIGS. 7A-7B (collectively "FIG. 7") are a flow diagram presenting an example method for optimizing delay diversity for effective communication of an uplink transmitted using transmit diversity, according to one or more embodiments.
Figure 7B:
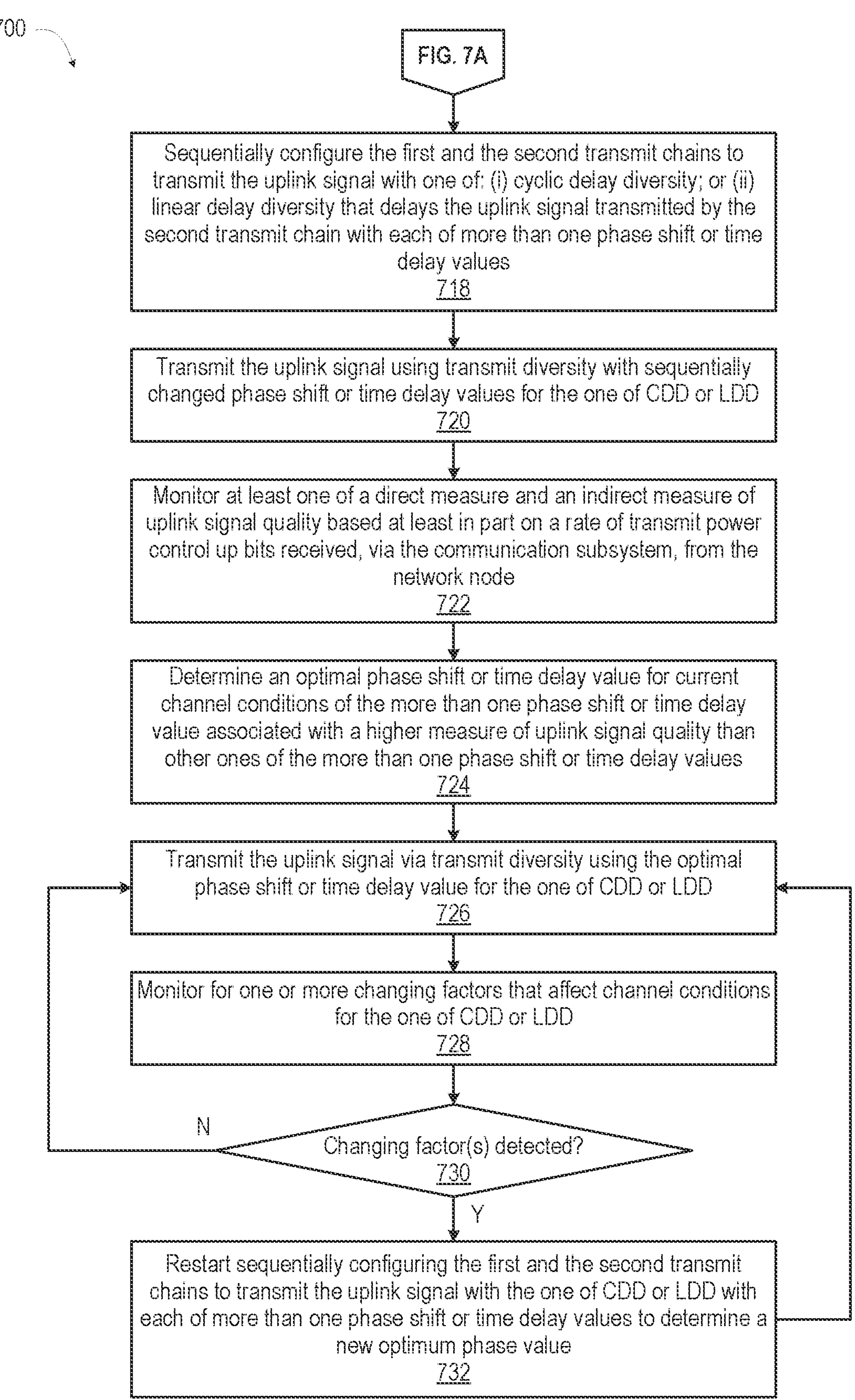
Figure 8:
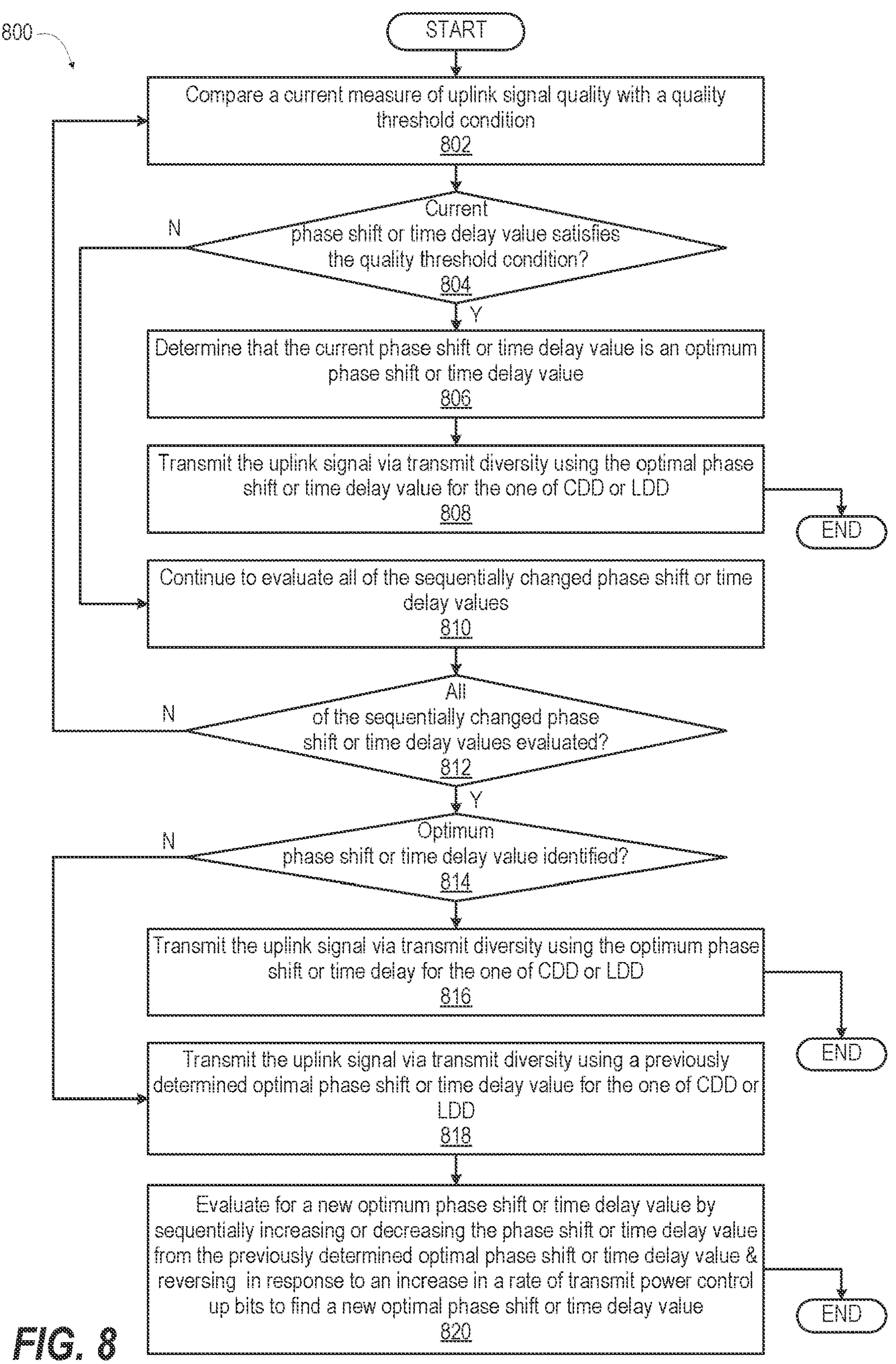
FIG. 8 is a flow diagram presenting an example method that expedites identifying of an optimum phase shift or time delay value and mitigates failure to identify an optimum phase shift or time delay value, according to one or more embodiments.

FIGS. 7A-7B (collectively “FIG. 7”) are a flow diagram presenting example method 700 for optimizing delay diversity for effective communication of an uplink transmitted using transmit diversity. FIG. 8 is a flow diagram presenting example method 800 that augments optimizing delay diversity by method 700 (FIGS. 7A-7B). In particular, method 800 expedites identifying of an optimum phase shift or time delay value and mitigates failure to identify an optimum phase shift or time delay value. The description of method 700 (FIGS. 7A-7B) and method 800 (FIG. 8) are provided with general reference to the specific components illustrated within the preceding FIGS. 1-2. Specific components referenced in method 700 (FIGS. 7A-7B) and method 800 (FIG. 8) may be identical or similar to components of the same name used in describing preceding FIGS. 1-2. In one or more embodiments, controller 101 configures communication device 100 (FIG. 1) or UE 204*a* (FIG. 2) to provide the described functionality of method 700 (FIGS. 7A-7B) and method 800 (FIG. 8).

With reference to FIG. 7A, method 700 includes determining, by a communication device, a transmit power requirement for an uplink signal to a network device (block 702). Method 700 includes determining whether the transmit power requirement is more than an individual capacity of either one of a first transmit chain and a second transmit chain of a communication subsystem of the communication device (decision block 704). In response to determining that the transmit power requirement is not more (i.e., equal to or less than) the individual capacity of either one of the first and the second transmit chain, method 700 includes configuring one of the first and the second transmit chains to transmit the uplink (method 706). Method 700 includes transmitting the uplink signal with the one of the first and second transmit chains (block 708). Then method 700 ends.

In response to determining that the transmit power requirement is more than the individual capacity of either one of the first and the second transmit chain, method 700 includes configuring the first and the second transmit chains of the communications subsystem of the communication device to perform transmit diversity to increase transmit power of the uplink signal to a network device (block 710). Method 700 includes determining a lower value and an upper value of a range of the more than one phase shift or time delay values based on one or more of: (i) resulting transmit power control up bits; (ii) cyclic prefix (CP) length; (iii) a number of resource block (RBs); (iv) a number of allocated subcarriers; and (v) subcarrier spacing received from the network node (block 712). In one or more embodiments, method 700 includes determining a rate of change of a channel environment between the communication device and the network device based on one or more of: (i) device mobility speed; and (ii) a rate of change in distance to the network device (block 714). Method 700 includes configuring a time duration of sequentially configuring the phase value and monitoring the measure of uplink signal quality in relation to the rate of change (block 716). Method 700 then proceeds to block 718 of FIG. 7B.

With reference to FIG. 7B, method 700 includes sequentially configuring the first and the second transmit chains to transmit the uplink signal with one of: (i) cyclic delay diversity; or (ii) linear delay diversity, which delays the uplink signal transmitted by the second transmit chain with each of more than one phase shift or time delay values (block 718). Method 700 includes transmitting the uplink signal using transmit diversity with sequentially changed phase shift or time delay values for the one of CDD or LDD (block 720). Method 700 includes monitoring at least one of a direct measure and an indirect measure of uplink signal quality based at least in part on a rate of transmit power control up bits received, via the communication subsystem, from the network node (block 722). A lowest rate of transmit power control up bits indicates an optimum phase shift or time delay value. Method 700 includes determining an optimal phase shift or time delay value for current channel conditions of the more than one phase shift or time delay value associated with a higher measure of uplink signal quality than other ones of the more than one phase shift or time delay values (block 724). Method 700 includes transmitting the uplink signal via transmit diversity using the optimal phase shift or time delay value for the one of CDD or LDD (block 726). In one or more embodiments, method 700 includes monitoring for one or more changing factors that affect channel conditions for the one of CDD or LDD (block 728). The one or more changing factors are among a group including: (i) device mobility speed; (ii) fading profile; (iii) operating frequency band; (iv) device operating region; (v) sensor-detected obstruction to uplink signal; (vi) radio access technology (RAT); (v) continuous transmit power control up bits; (vi) inability to decode transmit power control bits in a downlink from the network node; (vii) network allocation of one or more of size of resource block allocation and scheduling rate; and (viii) antenna correlation. Method 700 includes determining whether one or more of the changing factors are detected (decision block 730). In response to determining that the one or more changing factors are not detected, method 700 returns to block 726. In response to determining that at least one of the one or more changing factors is detected, method 700 includes restarting sequentially configuring the first and the second transmit chains to transmit the uplink signal with the one of CDD or LDD with each of more than one phase shift or time delay values to determine a new optimum phase value (block 732). Then method 700 returns to block 726.

With reference FIG. 8, method 800 includes comparing a current measure of uplink signal quality with a quality threshold condition (block 802). Method 800 includes determining whether a current phase shift or time delay value satisfies the quality threshold condition (decision block 804). In response to determining that the current phase shift or time delay value satisfies the quality threshold condition, method 800 includes determining that the current phase shift or time delay value is an optimum phase shift or time delay value (block 806). Method 800 includes transmitting the uplink signal via transmit diversity using the optimal phase shift or time delay value for the one of CDD or LDD (block 808). Then method 800 ends. In response to determining that the current phase shift or time delay value does not satisfy the quality threshold condition in decision block 804, method 800 includes continuing to evaluate all of the sequentially changed phase shift or time delay values (block 810). Method 800 includes determining whether all of the sequentially changed phase shift or time delay values have been evaluated (decision block 812). In response to determining that all of the sequentially changed phase shift or time delay values have not been evaluated, method 800 returns to block 802. In response to determining that all of the sequentially changed phase shift or time delay values have been evaluated, method 800 includes determining whether the optimum phase shift or time delay value is identified (decision block 814). In response to determining that the optimum phase shift or time delay value is identified, method 800 includes transmitting the uplink signal via transmit diversity using the optimum phase shift or time delay for the one of CDD or LDD (block 816). Then method 800 ends. In response to determining that a failure to identify an optimum phase shift or time delay value has occurred, method 800 includes transmitting the uplink signal via transmit diversity using a previously determined optimal phase shift or time delay value for the one of CDD or LDD (block 818). Method 800 includes evaluating for a new optimum phase shift or time delay value by sequentially increasing or decreasing the phase shift or time delay value from the previously determined optimal phase shift or time delay value and reversing a direction of sequentially changing the phase shift or time delay value, in response to an increase in a rate of transmit power control up bits, to find a new optimal phase shift or time delay value (block 820). Then method 800 ends.

Aspects of the present disclosure may be extended to Rank 1 UL MIMO with ULFPTx Mode 1 Support, previously referred herein as "Mode B" of the four Modes A-D. In contrast to "Mode A", Mode B is a more controlled version of transmit diversity under control of a base station and using existing precoding matrix options. Mode B can be configured on a slot-by-slot basis by the base station.

Figure 9:
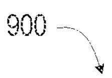
FIG. 9 depicts a communication diagram of a communication environment including a base station that sets up and a user equipment (UE) that implements CDD or LDD for uplink full power transmit (ULFPTx) mode 1, according to one or more embodiments.
Figure 9:
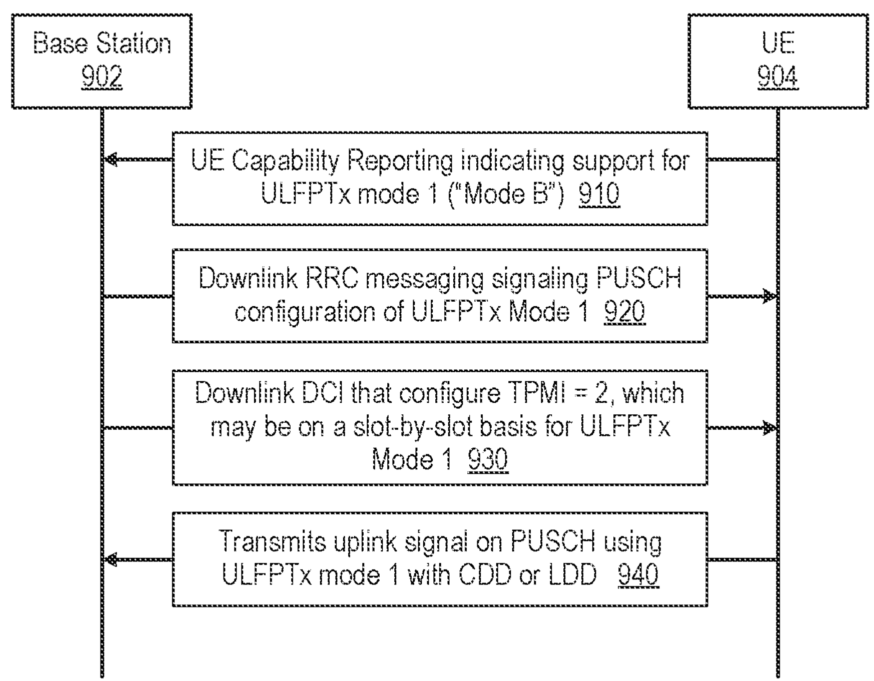

FIG. 9 depicts a communication diagram of a communication environment 900 including base station 902 that sets up and UE 904 that implements CDD or LDD for uplink full power transmit (ULFPTx) mode 1. At 910, the UE indicates support for ULFPTx mode 1 ("Mode B") through UE capability reporting. At 920, the base configures PUSCH through radio resource control (RRC) messaging for ULFPTx Mode 1 by signaling "ul-FullPowerTransmission-r16 fullpowerMode1". At 930, when desired, the base station transmits DCI that configure TPMI=2 in DCI formats 0_1, 1_1 or other formats that support additional configurations. The configuring may be on a slot-by-slot basis. At 940, UE transmits uplink signal on PUSCH using ULFPTx mode 1 with cyclic delay diversity (CDD) or linear delay diversity (LDD).

Primary uplink shared channel (PUSCH) configurations for three modes (i.e., Mode-1, Mode-2, and Mode-full power) are currently specified configuration for uplink full power transmission (ULFPTx). All three PUSCH configurations include codebook-based uplink with downlink control information (DCI) format 0_1, a single number of layers (1), and a number of transmit ports being 2. When transform precoding is disabled, the waveform configured is cyclic-prefix-orthogonal frequency division multiplexing (CP-OFDM). When transform precoding is enabled, the waveform configured is discrete-Fourier-transform-spread orthogonal frequency division multiplexing (DFT-s-OFDM). Total power matrix index (TPMI) for Mode-1 is 2. TPMI for Mode-2 is 0 or 1 based upon the full power TPMI reported by the communication device. TPMI for Mode-full power is 0 or 1.

TPMI Indices 0-5 indicate a precoding matrix W for single-layer transmission using two antenna ports:

$$TPMI\text{ Index 0: } \frac{1}{\sqrt{2}}\begin{bmatrix}1\\0\end{bmatrix};$$

$$TPMI\text{ Index 1: } \frac{1}{\sqrt{2}}\begin{bmatrix}0\\1\end{bmatrix};$$

$$TPMI\text{ Index 2: } \frac{1}{\sqrt{2}}\begin{bmatrix}1\\1\end{bmatrix};$$

$$TPMI\text{ Index 3: } \frac{1}{\sqrt{2}}\begin{bmatrix}1\\-1\end{bmatrix};$$

$$TPMI\text{ Index 4: } \frac{1}{\sqrt{2}}\begin{bmatrix}1\\j\end{bmatrix};$$

-continued $$\text{and } TPMI\text{ Index 5: } \frac{1}{\sqrt{2}}\begin{bmatrix}1\\-j\end{bmatrix}.$$

The above specified precoding matrix W per TPMI index provides the allowable single layer transmission matrix TPMI that maps the layers to the antennas. For ordinary single layer transmission, index 0 or 1 can be used. In those cases, only one antenna is mapped, and the maximum power is limited to the max power of a single transmit antenna chain. For TPMI 2, the transmission matrix indicates two active antennae. With each antenna fully capable of 26 dBm transmission, the combined output is 29 dBm. Note that the precoding matrix does have TPMI 3, 4, and 5, where the second transmission is phase shifted. These are coherent precoders, and the use of these outside of ULFPTX mode 1 is dependent on support for coherent and partially coherent codebook as discussed below. These other options for TMPI 3, 4 and 5 are not allowed for ULFPTx mode 1.

Note that when the base station sets TPMI to 0 or 1, the communication device or UE responds with single antenna port transmission and a maximum power of 26 dBm. If Transmit Diversity is supported, whether or not it is indicated by an information element (IE) "TxDiversity-r16", the radio of the UE does not operate in Transmit Diversity mode with 29 dBm combined output power because the transmission is a codebook-based transmission. Also, if PUSCH is not configured by "ul-FullPowerTransmission-r16 fullpowerMode 1" and if the UE does not support coherent or partially coherent precoders as indicates by UE capability reporting "PUSCH-TransCoherence", the base station cannot configure TPMI 2, 3, 4, and 5. If coherent or partially coherent precoders are supported and TPMI is set to 2 in the absence of ULFPTx mode 1 signaling, the UE operates as a power class 2 (PC2) radio and not power class 1.5 (PC1.5.)

Figure 10A:
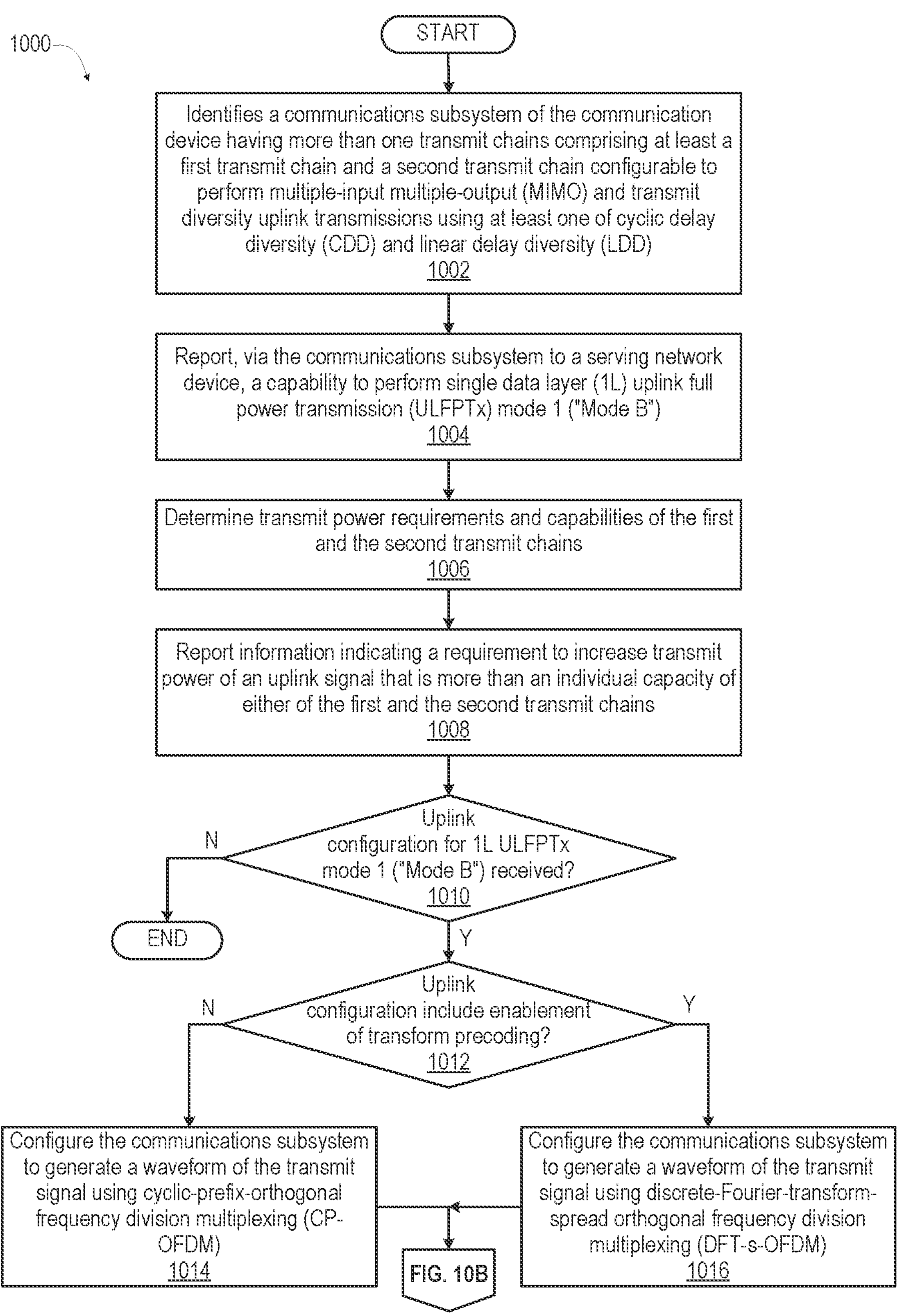
FIGS. 10A-10B (collectively "FIG. 10") are a flow diagram presenting a method performed by a communication device for optimizing delay diversity that enables effective communication using transmit diversity for increased transmit power while under base station control and using a codebook for uplink MIMO transmissions, according to one or more embodiments.
Figure 10B:
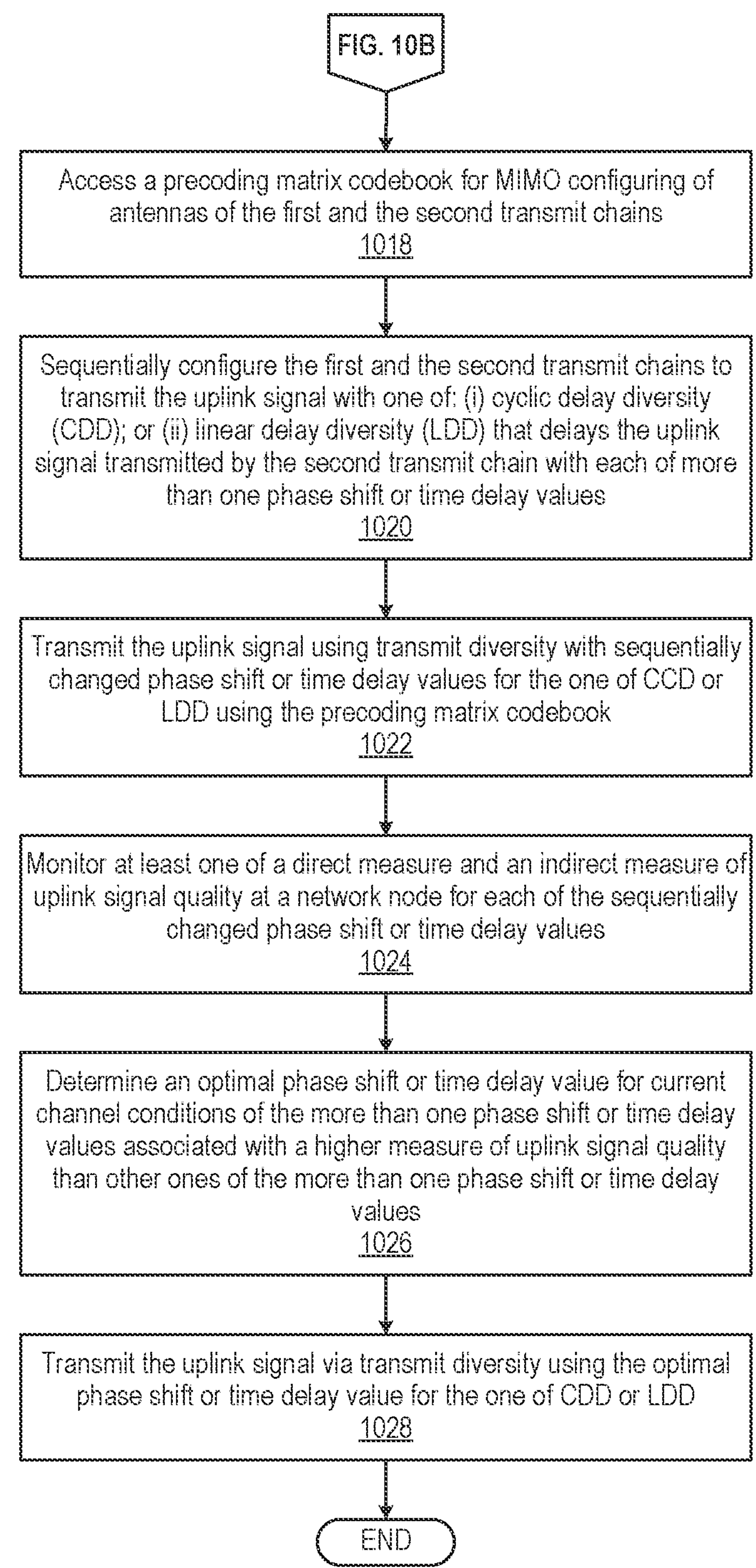

FIGS. 10A-10B (collectively "FIG. 10") are a flow diagram presenting method 1000 performed by a communication device for optimizing delay diversity that enables effective communication using transmit diversity for increased transmit power while under base station control and using a codebook for uplink MIMO transmissions. The descriptions of method 1000 (FIG. 10) is provided with general reference to the specific components illustrated within the preceding FIGS. 1-2. Specific components referenced in method 1000 (FIG. 10) may be identical or similar to components of the same name used in describing preceding FIGS. 1-2. In one or more embodiments, controller 101 configures communication device 100 (FIG. 1) or UE 204*a* (FIG. 2) to provide the described functionality of method 1000 (FIG. 10).

With reference to FIG. 10A, method 1000 includes identifying a communications subsystem of the communication device having more than one transmit chains including at least a first transmit chain and a second transmit chain configurable to perform multiple-input multiple-output (MIMO) and transmit diversity uplink transmissions using at least one of cyclic delay diversity (CDD) and linear delay diversity (LDD) (block 1002). Method 1000 includes reporting, via the communications subsystem to a serving network device, a capability to perform single data layer (1L) uplink full power transmission (ULFPTx) mode 1 ("Mode B") (block 1004). Method 1000 includes determining transmit power requirements and capabilities of the first and the second transmit chains (block 1006). Under certain conditions, method 1000 includes reporting information indicating a requirement to increase transmit power of an uplink signal that is more than an individual capacity of either of the first and the second transmit chains (block 1008). Method 1000 includes determining whether an uplink configuration for 1L ULFPTx mode 1 ("Mode B") is received, via the communications subsystem from the base station (decision block 1010). In response to determining that the uplink configuration for 1L ULFPTx mode 1 is not received, method 1000 ends. In response to receiving the uplink configuration for 1L ULFPTx mode 1, method 1000 includes determining whether the uplink configuration includes enablement of transform precoding (decision block 1012). In response to determining that transform precoding is disabled, method 1000 includes configuring the communications subsystem to generate a waveform of the transmit signal using cyclic-prefix-orthogonal frequency division multiplexing (CP-OFDM) (block 1014). In response to determining that transform precoding is enabled, method 1000 includes configuring the communications subsystem to generate a waveform of the transmit signal using discrete-Fourier-transform-spread orthogonal frequency division multiplexing (DFT-s-OFDM) (block 1016). After either block 1014 or 1016, method 1000 proceeds to block 1018 of FIG. 10B.

With reference to FIG. 10B, method 1000 includes accessing a precoding matrix codebook for MIMO configuring of antennas of the first and the second transmit chains (block 1018). Method 1000 includes sequentially configuring the first and the second transmit chains to transmit the uplink signal with one of: (i) cyclic delay diversity (CDD); or (ii) linear delay diversity (LDD), which delays the uplink signal transmitted by the second transmit chain with each of more than one phase shift or time delay values (block 1020). Method 1000 includes transmitting the uplink signal using transmit diversity with sequentially changed phase shift or time delay values for the one of CCD or LDD using the precoding matrix codebook (block 1022). Method 1000 includes monitoring at least one of a direct measure and an indirect measure of uplink signal quality at a network node for each of the sequentially changed phase shift or time delay values (block 1024). Method 1000 includes determining an optimal phase shift or time delay value for current channel conditions of the more than one phase shift or time delay values associated with a higher measure of uplink signal quality than other ones of the more than one phase shift or time delay values (block 1026). Method 1000 includes transmitting the uplink signal via transmit diversity using the optimal phase shift or time delay value for the one of CDD or LDD (block 1028). Then method 1000 ends.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. A communication device comprising:

a communications subsystem having more than one transmit chains comprising at least a first transmit chain and a second transmit chain configurable to perform multiple-input multiple-output (MIMO) and transmit diversity uplink transmissions; and a controller communicatively coupled to the communications subsystem, and which:

in response to receiving, via the communications subsystem from a base station, an uplink configuration for single data layer uplink full power transmission (ULFPTx) mode 1:

accesses a precoding matrix codebook for MIMO configuring of antennas of the first and the second transmit chains;

sequentially configures the first and the second transmit chains to transmit an uplink signal with one of: (i) cyclic delay diversity (CDD); or (ii) linear delay diversity (LDD) that delays the uplink signal transmitted by the second transmit chain with each of more than one phase shift or time delay values;

transmits the uplink signal using transmit diversity with sequentially changed phase shift or time delay values for the one of CCD or LDD using the precoding matrix codebook;

monitors at least one of a direct measure and an indirect measure of uplink signal quality at a network node for each of the sequentially changed phase shift or time delay values;

determines an optimal phase shift or time delay value for current channel conditions of the more than one phase shift or time delay values associated with a higher measure of uplink signal quality than other ones of the more than one phase shift or time delay values; and transmits the uplink signal via transmit diversity using the optimal phase shift or time delay value for the one of CDD or LDD.

2. The communication device of claim 1, wherein, prior to receiving the uplink configuration, the controller reports, via the communications subsystem to a serving network device, a capability to perform single data layer uplink full power transmission mode 1.

3. The communication device of claim 1, wherein, prior to receiving the uplink configuration, the controller reports information indicating a requirement to increase transmit power of an uplink signal that is more than an individual capacity of either of the first and the second transmit chains.

4. The communication device of claim 1, wherein the controller:

determines whether the uplink configuration comprises enablement of transform precoding;

generates a waveform of the transmit signal using cyclic-prefix-orthogonal frequency division multiplexing (CP-OFDM) in response to determining that transform precoding is disabled; and generates the waveform of the transmit signal using discrete-Fourier-transform-spread orthogonal frequency division multiplexing (DFT-s-OFDM) in response to determining that transform precoding is enabled.

5. The communication device of claim 1, wherein the controller monitors the measure of uplink signal quality comprising a rate of transmit power control up bits received, via the communication subsystem, from the network node, wherein a lowest rate of transmit power control up bits indicates an optimum phase shift or time delay value.

6. The communication device of claim 5, wherein the controller:

sequentially increases or decreases the phase shift or time delay value; and in response to determining that the rate of receiving transmit power control up bits is increased, reverses a direction of sequentially changing the phase shift or time delay value to find the optimal phase shift or time delay value.

7. The communication device of claim 5, wherein the controller determines a lower value and an upper value of a range of the more than one phase shift or time delay values based on resulting transmit power control up bits, cyclic prefix (CP) length, a number of resource block (RBs), a number of allocated subcarriers, and subcarrier spacing received from the network node.

8. The communication device of claim 1, wherein the controller:

in response to a failure to identify an optimum phase shift or time delay value:

transmits the uplink signal via transmit diversity using a previously determined optimal phase shift or time delay value for the one of CDD or LDD;

sequentially increases or decreases the phase shift or time delay value from the previously determined optimal phase shift or time delay value; and in response to determining that a rate of receiving transmit power control up bits is increased, reverses a direction of sequentially changing the phase shift or time delay value to find a new optimal phase shift or time delay value.

9. The communication device of claim 1, wherein the controller:

compares a current measure of uplink signal quality with a quality threshold condition; and determines a current phase shift or time delay value to be an optimum phase shift or time delay value in response to the current measure of uplink signal quality satisfying the quality threshold condition.

10. The communication device of claim 1, wherein the controller:

monitors for one or more changing factors that affect channel conditions for CDD or LDD; and in response to detecting at least one of the one or more changing factors, restarts sequentially configuring the first and the second transmit chains to transmit the uplink signal with the one of CDD or LDD with each of more than one phase shift or time delay values to determine a new optimum phase shift or time delay value.

11. The communication device of claim 10, wherein the one or more changing factors are among a group comprising: (i) device mobility speed; (ii) fading profile; (iii) operating frequency band; (iv) device operating region; (v) sensor-detected obstruction to uplink signal; (vi) radio access technology (RAT); (v) continuous transmit power control up bits; (vi) inability to decode transmit power control bits in a downlink from the network node; (vii) network allocation of one or more of size of resource block allocation and scheduling rate; and (viii) antenna correlation.

12. The communication device of claim 1, wherein the controller:

determines a rate of change of a channel environment between the communication device and the network device based on one or more of: (i) device mobility speed; and (ii) a rate of change in distance to the network device; and configures a time duration of sequentially configuring the phase shift or time delay value and monitoring the measure of uplink signal quality in relation to the rate of change.

13. A method comprising:

configuring a communications subsystem of a communication device having more than one transmit chains comprising at least a first transmit chain and a second transmit chain to perform multiple-input multiple-output (MIMO) and transmit diversity uplink transmissions; and in response to receiving, via the communications subsystem from a base station, an uplink configuration for single data layer uplink full power transmission (ULFPTx) mode 1:

accessing a precoding matrix codebook for MIMO configuring of antennas of the first and the second transmit chains;

sequentially configuring the first and the second transmit chains to transmit an uplink signal with one of: (i) cyclic delay diversity; or (ii) linear delay diversity that delays the uplink signal transmitted by the second transmit chain with each of more than one phase shift or time delay values;

transmitting the uplink signal using transmit diversity with sequentially changed phase shift or time delay values for the one of CDD or LDD using the precoding matrix codebook;

monitoring at least one of a direct measure and an indirect measure of uplink signal quality at a network node for each of the sequentially changed phase shift or time delay values;

determining an optimal phase shift or time delay value for current channel conditions of the more than one phase shift or time delay value associated with a higher measure of uplink signal quality than other ones of the more than one phase shift or time delay values; and transmitting the uplink signal via transmit diversity using the optimal phase shift or time delay value for the one of CDD or LDD.

14. The method of claim 13, further comprising, prior to receiving the uplink configuration, reporting, via the communications subsystem to a serving network device, a capability to perform single data layer uplink full power transmission mode 1.

15. The method of claim 13, further comprising, prior to receiving the uplink configuration, reporting information indicating a requirement to increase transmit power of an uplink signal that is more than an individual capacity of either of the first and the second transmit chains.

16. The method of claim 13, further comprising:

determining whether the uplink configuration comprises enablement of transform precoding;

generating a waveform of the transmit signal using cyclic-prefix-orthogonal frequency division multiplexing (CP-OFDM) in response to determining that transform precoding is disabled; and generating the waveform of the transmit signal using discrete-Fourier-transform-spread orthogonal frequency division multiplexing (DFT-s-OFDM) in response to determining that transform precoding is enabled.

17. The method of claim 13, further comprising:

monitoring the measure of uplink signal quality comprising a rate of transmit power control up bits received, via the communication subsystem, from the network node, wherein a lowest rate of transmit power control up bits indicates an optimum phase shift or time delay value;

sequentially increasing or decreasing the phase shift or time delay value;

in response to determining that the rate of receiving transmit power control up bits is increased, reversing a direction of sequentially changing the phase shift or time delay value to find the optimal phase shift or time delay value; and determining a lower value and an upper value of a range of the more than one phase shift or time delay values based on resulting transmit power control up bits, cyclic prefix (CP) length, a number of resource block (RBs), a number of allocated subcarriers, and subcarrier spacing received from the network node.

18. The method of claim 13, further comprising:

in response to a failure to identify an optimum phase shift or time delay value:

transmitting the uplink signal via transmit diversity using a previously determined optimal phase shift or time delay value for the one of CDD or LDD;

sequentially increasing or decreasing the phase shift or time delay value from the previously determined optimal phase shift or time delay value;

in response to determining that a rate of receiving transmit power control up bits is increased, reversing a direction of sequentially changing the phase shift or time delay value to find a new optimal phase shift or time delay value;

comparing a current measure of uplink signal quality with a quality threshold condition; and determining a current phase shift or time delay value to be an optimum phase shift or time delay value in response to the current measure of uplink signal quality satisfying the quality threshold condition.

19. The method of claim 13, further comprising:

monitoring for one or more changing factors that affect channel conditions for the one of CDD or LDD;

in response to detecting at least one of the one or more changing factors, restarting sequentially configuring the first and the second transmit chains to transmit the uplink signal with the one of CDD or LDD with each of more than one phase shift or time delay values to determine a new optimum phase value, wherein the one or more changing factors are among a group comprising: (i) device mobility speed; (ii) fading profile; (iii) operating frequency band; (iv) device operating region; (v) sensor-detected obstruction to uplink signal; (vi) radio access technology (RAT); (v) continuous transmit power control up bits; (vi) inability to decode transmit power control bits in a downlink from the network node; (vii) network allocation of one or more of size of resource block allocation and scheduling rate; and (viii) antenna correlation;

determining a rate of change of a channel environment between the communication device and the network device based on one or more of: (i) device mobility speed; and (ii) a rate of change in distance to the network device; and configuring a time duration of sequentially configuring the phase value and monitoring the measure of uplink signal quality in relation to the rate of change.

20. A computer program product comprising:

a non-transitory computer readable storage device; and program code on the computer readable storage device that when executed by a processor associated with a communication device, the program code enables the communication device to provide functionality of:

configuring a communications subsystem having more than one transmit chains comprising at least a first transmit chain and a second transmit chain to perform multiple-input multiple-output (MIMO) and transmit diversity uplink transmissions; and in response to receiving, via the communications subsystem from a base station, an uplink configuration for single data layer uplink full power transmission (ULFPTx) mode 1:

accessing a precoding matrix codebook for MIMO configuring of antennas of the first and the second transmit chains;

sequentially configuring the first and the second transmit chains to transmit an uplink signal with (i) cyclic delay diversity (CDD); or (ii) linear delay diversity (LDD) that delays the uplink signal transmitted by the second transmit chain with each of more than one phase shift or time delay values;

transmitting the uplink signal using transmit diversity with sequentially changed phase shift or time delay values for the one of CDD or LDD using the precoding matrix codebook;

monitoring at least one of a direct measure and an indirect measure of uplink signal quality at a network node for each of the sequentially changed phase shift or time delay values;

determining an optimal phase shift or time delay value for current channel conditions of the more than one phase shift or time delay value associated with a higher measure of uplink signal quality than other ones of the more than one phase shift or time delay values; and transmitting the uplink signal via transmit diversity using the optimal phase shift or time delay value for the one of CDD or LDD.

* * * * *